United States Patent
Shimada et al.

(10) Patent No.: US 12,160,190 B2
(45) Date of Patent: Dec. 3, 2024

(54) ROTATING ELECTRICAL MACHINE CONTROL SYSTEM

(71) Applicants: AISIN CORPORATION, Aichi (JP); BluE Nexus Corporation, Aichi (JP)

(72) Inventors: Arinori Shimada, Kariya (JP); Daisuke Yamashita, Kariya (JP); Yomei Hakumura, Anjo (JP); Kenji Morimoto, Anjo (JP)

(73) Assignees: AISIN CORPORATION, Aichi (JP); BluE Nexus Corporation, Aichi (JP)

( * ) Notice: Subject to any disclaimer, the term of this patent is extended or adjusted under 35 U.S.C. 154(b) by 128 days.

(21) Appl. No.: 18/040,090

(22) PCT Filed: Aug. 31, 2021

(86) PCT No.: PCT/JP2021/031957
§ 371 (c)(1),
(2) Date: Jan. 31, 2023

(87) PCT Pub. No.: WO2022/050277
PCT Pub. Date: Mar. 10, 2022

(65) Prior Publication Data
US 2023/0291341 A1    Sep. 14, 2023

(30) Foreign Application Priority Data

Sep. 2, 2020 (JP) .................. 2020-147548
Sep. 2, 2020 (JP) .................. 2020-147549

(51) Int. Cl.
*H02P 27/08* (2006.01)
*H02P 21/05* (2006.01)
(Continued)

(52) U.S. Cl.
CPC ............ *H02P 21/05* (2013.01); *H02P 21/14* (2013.01); *H02P 21/22* (2016.02)

(58) Field of Classification Search
CPC .......... H02P 21/05; H02P 21/14; H02P 21/22; H02P 6/10; H02P 29/50
See application file for complete search history.

(56) References Cited

U.S. PATENT DOCUMENTS 11,296,617 B2 *    4/2022   Shimada ............... B60L 3/0061

OTHER PUBLICATIONS

Antti Piippo et al., "Torque Ripple Reduction in Sensorless PMSM Drives", In Proceedings of the 32nd Annual Conference of the IEEE Industrial Electronics Society (IECON'06), Paris, France, 2006, pp. 920-925.

(Continued)

*Primary Examiner* — Muhammad S Islam
(74) *Attorney, Agent, or Firm* — Sughrue Mion, PLLC

(57) ABSTRACT

A rotating electrical machine control system includes a base current instruction setting part that sets a base current instruction based on target torque of a rotating electrical machine; a correction current instruction setting part that sets a correction current instruction with a frequency determined based on torque ripple; and a current control part that performs current feedback control to compute a voltage instruction which is an instruction value of a voltage to be applied to the rotating electrical machine. The current control part includes a first current control part whose control target is a component of the base current instruction; and a second current control part whose control target is a component of the correction current instruction. A gain of the second current control part is set to be low compared to a gain of the first current control part.

7 Claims, 10 Drawing Sheets

(51) Int. Cl.
*H02P 21/14* (2016.01)
*H02P 21/22* (2016.01)

(56) References Cited

OTHER PUBLICATIONS

International Search Report for PCT/JP2021/031957 dated Nov. 2, 2021.

* cited by examiner

ROTATING ELECTRICAL MACHINE CONTROL SYSTEM

CROSS REFERENCE TO RELATED APPLICATIONS

This application is a National Stage of International Application No. PCT/JP2021/031957 filed Aug. 31, 2021, claiming priority based on Japanese Patent Application No. 2020-147549 filed Sep. 2, 2020 and Japanese Patent Application No. 2020-147548 filed Sep. 2, 2020, the entire contents of which are incorporated in their entirety.

TECHNICAL FIELD

The present disclosure relates to a rotating electrical machine control system that performs current feedback control on a rotating electrical machine of a permanent magnet type which is a control target in a d-q-axis orthogonal vector coordinate system.

BACKGROUND ART

The paper "Torque Ripple Reduction in Sensorless PMSM Drives." by Antti Piippo and Jorma Luomi shows a technique in which in order to suppress torque ripple of a rotating electrical machine, a harmonic correction current instruction with a frequency corresponding to the torque ripple is superimposed on a current instruction. The correction current instruction is a current instruction for outputting correction torque in opposite phase to the torque ripple, and the torque ripple is reduced by the correction torque outputted using the correction current instruction. The current instruction in a d-q-axis orthogonal vector coordinate system is direct current, but the correction current instruction is alternating current. Hence, a controller whose control target is a conventional current instruction on which a correction current instruction is not superimposed cannot always appropriately control a current instruction on which a correction current instruction is superimposed. In the above-described paper, responsiveness is improved by adding a controller that supports alternating current, in parallel with a conventional controller.

CITATIONS LIST

Non-Patent Literature

Non-Patent Literature 1: Antti Piippo, Jorma Luomi, "Torque Ripple Reduction in Sensorless PMSM Drives.", The 32nd Annual Conference of the IEEE Industrial Electronic Society (IECON '06), pp. 920-925

SUMMARY OF THE DISCLOSURE

Technical Problems

The technique described in the above-described paper functions very effectively when torque of the rotating electrical machine is in a constant steady state. That is, a current instruction on which a correction current instruction is superimposed is appropriately controlled and torque ripple is effectively suppressed. However, when the rotating electrical machine is, for example, a drive power source of a vehicle, the added controller may also react to an alternating-current component generated when torque of the rotating electrical machine suddenly fluctuates (step fluctuations) or continuously fluctuates (sweep fluctuations). As a result, there is a possibility of inducing a phenomenon in which overshoot occurs or oscillation occurs in torque of the rotating electrical machine, which is so-called control interference.

In view of the above-described background, provision of a technique is sought that can appropriately reduce torque ripple without causing control interference even in a rotating electrical machine whose torque fluctuates.

Solutions to Problems

A rotating electrical machine control system that considers the above description is a rotating electrical machine control system that performs current feedback control on a rotating electrical machine of a permanent magnet type in a d-q-axis orthogonal vector coordinate system having a d-axis extending in a direction of field flux generated by permanent magnets and a q-axis orthogonal to the d-axis, the rotating electrical machine being a control target and driven by N-phase alternating current (N is any natural number), and includes: a base current instruction setting part that sets a base current instruction serving as a current instruction, based on target torque of the rotating electrical machine, the current instruction being an instruction value of a current to flow through the rotating electrical machine; a correction current instruction setting part that sets a correction current instruction, the correction current instruction being a current instruction to be superimposed on the base current instruction to reduce torque ripple of the rotating electrical machine and being alternating current with a frequency determined based on the torque ripple of a reduction target; and a current control part that performs current feedback control based on deviation between a target current instruction and an actual current, to compute a voltage instruction, the target current instruction being a control target and obtained by adding together the base current instruction and the correction current instruction, the actual current being a current flowing through the rotating electrical machine, and the voltage instruction being an instruction value of a voltage to be applied to the rotating electrical machine, and the current control part includes a first current control part whose control target is a component of the base current instruction; and a second current control part whose control target is a component of the correction current instruction, and a gain of the second current control part is set to be low compared to a gain of the first current control part.

The component of the base current instruction which is a control target of the first current control part is direct current in the d-q-axis orthogonal vector coordinate system, and the component of the correction current instruction which is a control target of the second current control part is alternating current in the d-q-axis orthogonal vector coordinate system. By the current control part thus including the first current control part and the second current control part that have different control targets, current control can be appropriately performed on the base current instruction on which the correction current instruction is superimposed, which is a control target. Meanwhile, when the target torque is suddenly changed, the base current instruction also suddenly changes, following the change. Since this change point includes a high frequency component, the second current control part also performs current control targeting the base current instruction, which may cause overshoot or oscillation in a voltage instruction to be outputted. That is, there is a possibility of occurrence of control interference. However, according to this configuration, since the gain of the second current control part is set to be low compared to the gain of the first current control part, such overshoot is suppressed and occurrence of oscillation is also suppressed. Namely, according to this configuration, even in a rotating electrical machine whose torque fluctuates, torque ripple can be appropriately reduced without causing control interference.

Further features and advantages of the rotating electrical machine control system will become apparent from the following description of embodiments which will be described with reference to drawings.

DESCRIPTION OF EMBODIMENTS

Figure 1:
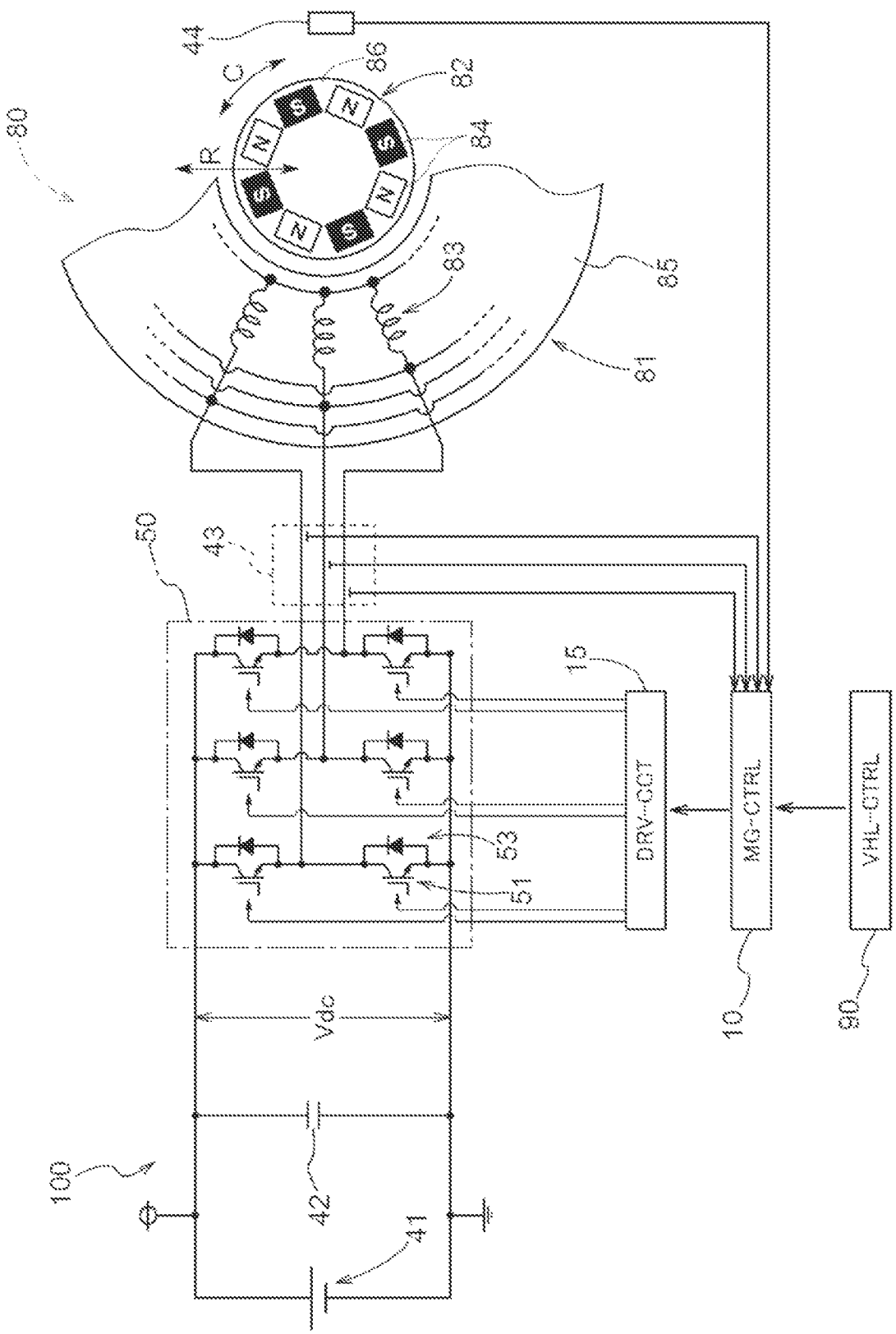
FIG. 1 is a block diagram schematically showing a configuration of a rotating electrical machine driving device.
Figure 2:
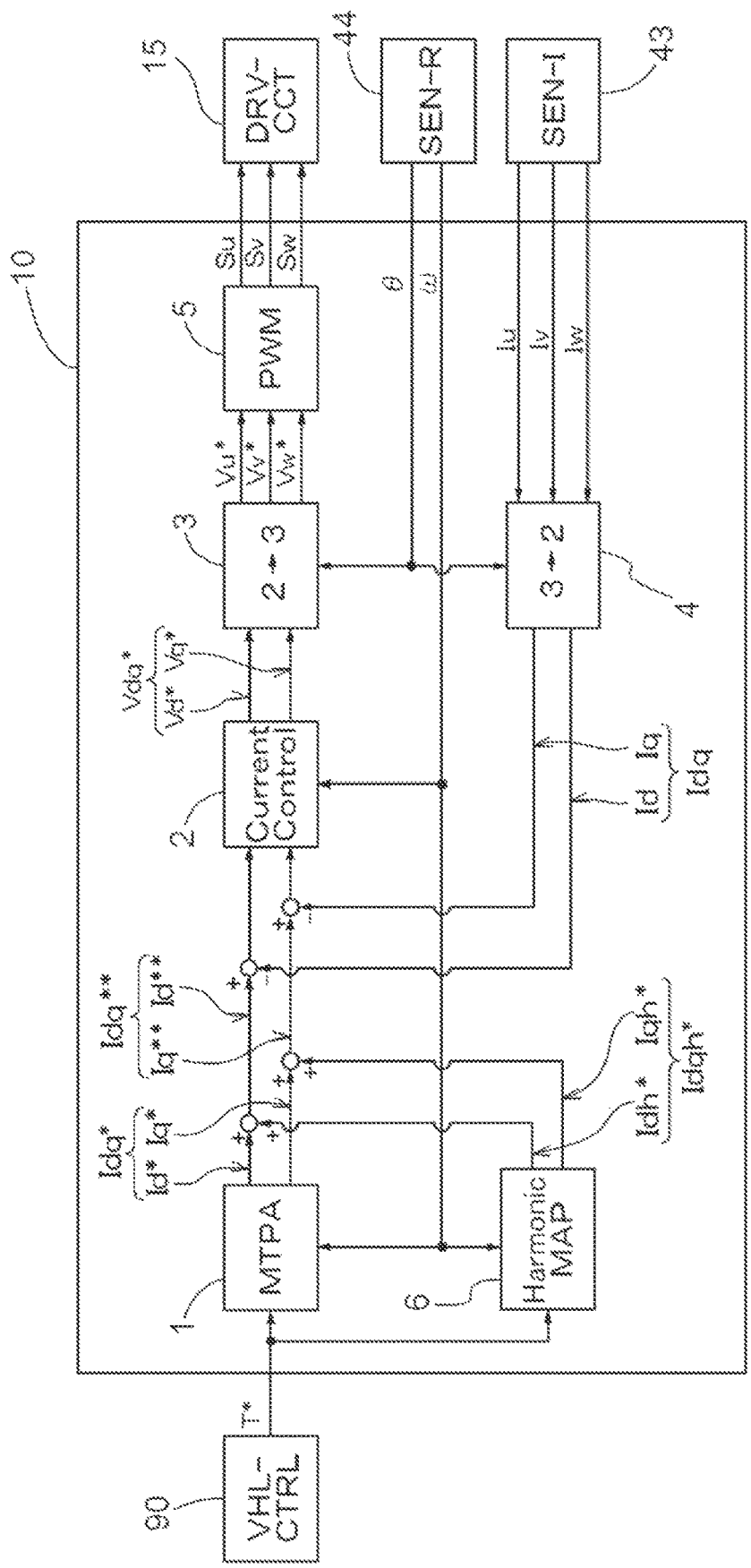
FIG. 2 is a block diagram schematically showing a configuration of a rotating electrical machine control device which is a core of the rotating electrical machine driving device.
Figure 3:
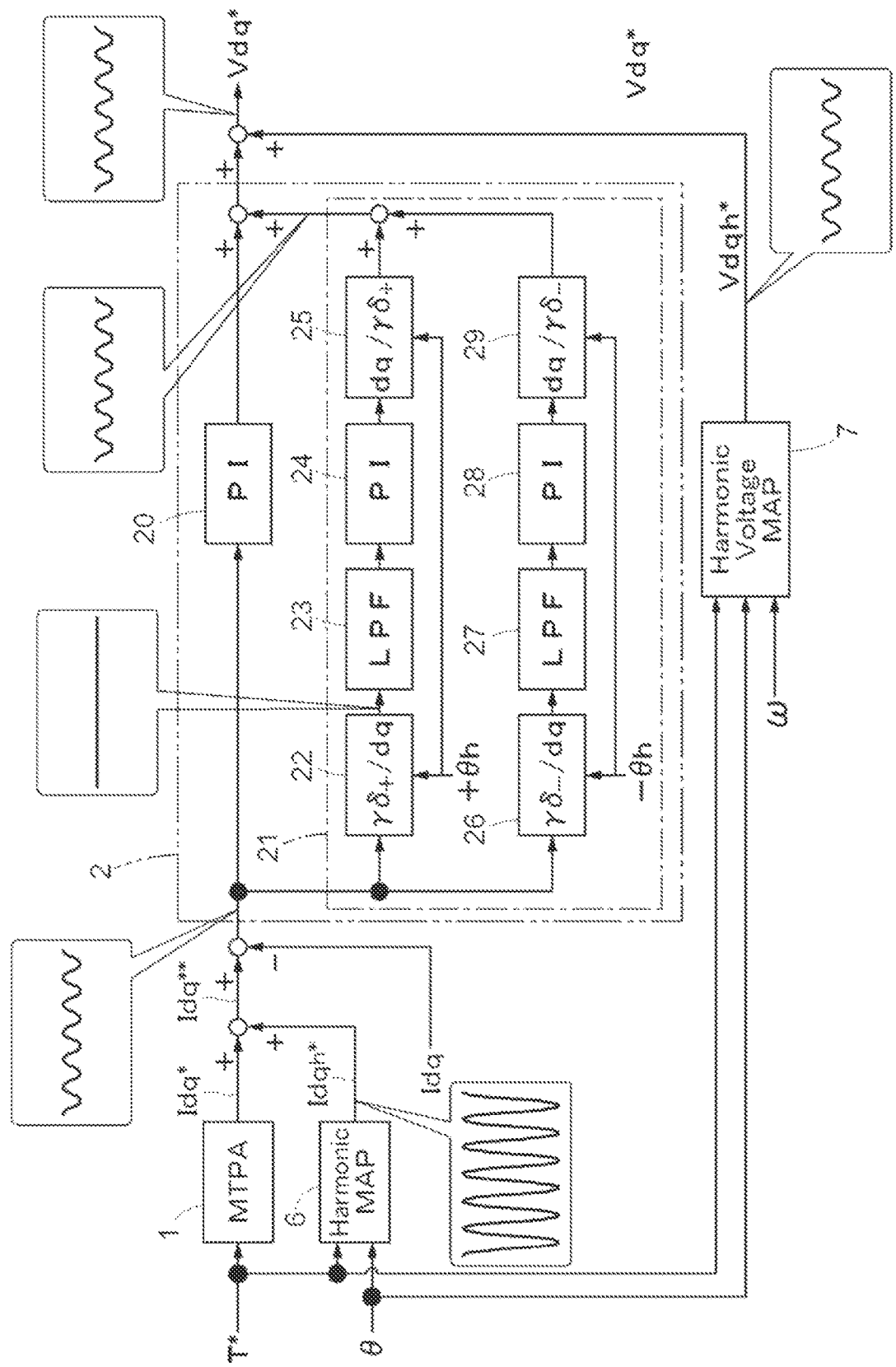
FIG. 3 is a schematic control block diagram of parts around a current control part in the rotating electrical machine control device.

An embodiment of a rotating electrical machine control system will be described below based on the drawings. The rotating electrical machine control system performs current feedback control on, for example, a rotating electrical machine which is a control target and serves as a drive power source of a vehicle. A block diagram of FIG. 1 schematically shows a system configuration of a rotating electrical machine driving device 100 including a rotating electrical machine control device 10 (MG-CTRL). In addition, a block diagram of FIG. 2 schematically shows a system configuration of the rotating electrical machine control device 10 which is a core of the rotating electrical machine driving device 100. In addition, a control block diagram of FIG. 3 shows schematic configurations of parts around a current control part 2 in the rotating electrical machine control device 10. Note that in a broad definition, the rotating electrical machine driving device 100 corresponds to a rotating electrical machine control system, and in a narrow definition, the rotating electrical machine control device 10 corresponds to a rotating electrical machine control system.

A rotating electrical machine 80 which is a drive target of the rotating electrical machine control system is an interior permanent magnet rotating electrical machine (IPMSM: interior permanent magnet synchronous motor) including a stator 81 in which stator coils 83 of N phases (N is any natural number) are disposed on a stator core 85; and a rotor 82 in which permanent magnets 84 are disposed in a rotor core 86. Although FIG. 1 exemplifies the rotor 82 with eight poles (four pole pairs) that has eight magnetic poles (four N-poles and four S-poles), this is a schematic configuration and the disclosure is not limited thereto. The same can also be said for the stator 81, and although FIG. 1 exemplifies a mode in which the stator coils 83 of three phases are short-circuited at a neutral point, the disclosure is not limited to the shown number of phases, connection method, way of winding the stator coils 83, etc. Note that the rotating electrical machine 80 can function as both a motor and a generator. When the rotating electrical machine 80 functions as a motor, the rotating electrical machine 80 is in a motoring state, and when the rotating electrical machine 80 functions as a generator, the rotating electrical machine 80 is in a regeneration state.

As shown in FIG. 1, the rotating electrical machine driving device 100 includes an inverter of a voltage type 50. The inverter 50 is connected to the rotating electrical machine of alternating current 80 and a direct-current power supply 41 to convert electric power between alternating current of a plurality of phases and direct current. The direct-current power supply 41 includes, for example, a rechargeable secondary battery (battery) such as a lithium-ion battery, or an electric double-layer capacitor. When the rotating electrical machine 80 is a drive power source of a vehicle, the direct-current power supply 41 is a high-voltage, large-capacity direct-current power supply and has a rated power supply voltage of, for example, 200 to 400 [V]. The inverter 50 includes, on its direct-current side, a smoothing capacitor (direct-current link capacitor 42) that smooths out a voltage between positive and negative (direct-current link voltage Vdc).

The inverter 50 is configured to include a plurality of switching devices 51. For the switching devices 51, it is preferred to apply power semiconductor devices that can operate at high frequencies, such as insulated gate bipolar transistors (IGBTs), power metal oxide semiconductor field effect transistors (MOSFETs), silicon carbide-metal oxide semiconductor FETs (SiC-MOSFETs), SiC-static induction transistors (SiC-SITs), and gallium nitride-MOSFETs (GaN-MOSFETs). FIG. 1 exemplifies a mode in which IGBTs are used as the switching devices 51. Note that each switching device 51 includes a freewheeling diode 53 in parallel thereto, with a direction going from negative to positive (a direction going from a lower-stage side to an upper-stage side) being a forward direction.

As shown in FIG. 1, the inverter 50 is controlled by the rotating electrical machine control device 10. The rotating electrical machine control device 10 is constructed using a logic circuit such as a microcomputer as a core member. For example, the rotating electrical machine control device 10 drives the rotating electrical machine 80 through the inverter 50 by performing current feedback control that uses a vector control method, based on target torque (torque instruction T*: see FIG. 2, etc.) of the rotating electrical machine 80 which is provided as a request signal from other control devices, etc., such as a vehicle control device 90 (VHL-CTRL) which is one of higher-level control devices. In the vector control method, feedback control is performed by coordinate-transforming currents (Iu, Iv, and Iw: see FIG. 2) flowing through the stator coils 83 of the respective three phases (N phases) of an alternating-current motor into vector components on a d-axis which is a direction of a magnetic field generated by the permanent magnets 84 disposed in the rotor 82 and a q-axis which is a direction orthogonal to the d-axis (a direction advanced by an electrical angle of $\pi/2$ relative to the direction of the magnetic field). A coordinate system in which coordinate transformation is performed is referred to as d-q-axis orthogonal coordinate system.

An actual current flowing through the stator coil 83 of each phase of the rotating electrical machine 80 is detected by a current sensor 43, and the rotating electrical machine control device 10 obtains results of the detection. Note that although here a mode in which three-phase alternating current is detected is exemplified, for example, in a case of three-phase alternating current, since three phases are balanced and the sum of instantaneous values thereof is zero, currents of only two phases may be detected and the remaining one phase may be obtained by the rotating electrical machine control device 10 performing computation. In addition, a magnetic pole position θ (electrical angle) of the rotor 82 of the rotating electrical machine 80 at each time point and the rotational speed (angular velocity ω) of the rotor 82 are detected by a rotation sensor 44, e.g., a resolver, and the rotating electrical machine control device 10 obtains results of the detection. The rotating electrical machine control device 10 performs current feedback control using the results of detection obtained by the current sensor 43 and the rotation sensor 44.

As shown in FIG. 2, the rotating electrical machine control device 10 is configured to include various functional parts for current feedback control, and each functional part is implemented by cooperation of hardware such as a microcomputer and software (program). In the present embodiment, the rotating electrical machine control device 10 includes a torque control part (MTPA: maximum torque per ampere control) 1, a current control part (Current Control) 2, a two-to-three-phase coordinate transforming part 3, a three-to-two-phase coordinate transforming part 4, a modulating part 5 (PWM), and a correction current instruction setting part 6 (Harmonic MAP).

The torque control part 1 sets a target current (base current instruction Idq*) that flows through the stator coils 83 of the rotating electrical machine 80, based on a torque instruction T* (target torque) transmitted from the vehicle control device 90. Namely, the torque control part 1 corresponds to a base current instruction setting part. As described above, the rotating electrical machine control device 10 performs feedback control on the rotating electrical machine 80 in the d-q-axis orthogonal vector coordinate system, and thus, the torque control part 1 computes, as the base current instruction Idq*, a d-axis base current instruction Id* and a q-axis base current instruction Iq*. As will be described later, in the present embodiment, a corrected current instruction Idq** in which a correction current instruction Idqh* is superimposed on the base current instruction Idq* is a control target of a subsequent stage. Namely, the corrected current instruction Idq corresponds to a target current instruction which is a control target of the current control part 2**.

The current control part 2 computes a voltage instruction Vdq* which is an instruction for a voltage to be applied to the inverter 50, based on deviation between the corrected current instruction Idq and actual currents (a d-axis current Id and a q-axis current Iq) flowing through the stator coils 83. Currents to be detected by the current sensor 43 (SEN-I) are three-phase actual currents (a U-phase current Iu, a V-phase current Iv, and a W-phase current Iw) flowing through the stator coils 83. The three-phase actual currents are transformed by the three-to-two-phase coordinate transforming part 4 into two-phase currents (a d-axis current Id and a q-axis current Iq) in the d-q-axis vector coordinate system. The three-to-two-phase coordinate transforming part 4 performs coordinate transformation based on a magnetic pole position θ (electrical angle) of the rotor 82 at each time point which is detected by the rotation sensor 44** (SEN-R).

The current control part 2 computes a d-axis voltage instruction Vd* based on deviation between a d-axis current instruction (here, a corrected d-axis current instruction Id**) and the d-axis current Id and rotational speed (angular velocity ω), and computes a q-axis voltage instruction Vq* based on deviation between a q-axis current instruction (here, a corrected q-axis current instruction Iq) and the q-axis current Iq and the rotational speed (angular velocity ω). Note that as will be described later with reference to FIG. 3, in the present embodiment, a mode in which the current control part 2 is configured to include proportional-integral controllers (PIs) is exemplified, but the current control part 2** may be configured to include proportional-integral-derivative controllers (PIDs).

The two-to-three-phase coordinate transforming part 3 coordinate-transforms the two-phase voltage instruction Vdq* (the d-axis voltage instruction Vd* and the q-axis voltage instruction Vq*) in the d-q-axis vector coordinate system into three-phase voltage instructions (a U-phase voltage instruction Vu*, a V-phase voltage instruction Vv*, and a W-phase voltage instruction Vw*) for the inverter 50 of three phases. The modulating part 5 generates three-phase switching control signals (a U-phase switching control signal Su, a V-phase switching control signal Sv, and a W-phase switching control signal Sw) for the inverter 50, based on the respective three-phase voltage instructions (the U-phase voltage instruction Vu*, the V-phase voltage instruction Vv*, and the W-phase voltage instruction Vw*). Here, a mode is exemplified in which the modulating part 5 generates switching control signals by pulse width modulation (PWM). Note that although FIG. 2 simply shows three switching control signals (Su, Sv, and Sw), the modulating part 5 generates six switching control signals (a U-phase upper-stage-side switching control signal, a U-phase lower-stage-side switching control signal, . . . ) for the six switching devices 51 in the inverter 50.

As shown in FIGS. 1 and 2, a control terminal of each switching device 51 (e.g., a gate terminal of an IGBT) included in the inverter 50 is connected to the rotating electrical machine control device 10 through a drive circuit 15 (DRV-CCT), and the switching devices 51 are individually subjected to switching control. As described above, the rotating electrical machine control device 10 that generates switching control signals includes a microcomputer, etc., as a core, and the operating voltage thereof is, for example, 5 [V] or 3.3 [V]. On the other hand, the inverter 50 is, as described above, connected to the direct-current power supply 41 having a rated power supply voltage of, for example, 200 to 400 [V], and a drive signal of, for example, 15 to 20 [V] needs to be inputted to the control terminals of the switching devices 51. The drive circuit 15 improves each of driving capabilities (capabilities to allow a circuit at a subsequent stage to operate, e.g., voltage amplitude and output current) of the switching control signals generated by the rotating electrical machine control device 10, and relays the switching control signals to the inverter 50.

Meanwhile, in the rotating electrical machine 80 of an interior permanent magnet type, torque ripple occurs due to a change in flux linkage upon rotation of the rotor 82. Namely, an excitation force (torque ripple) occurs in a circumferential direction C shown in FIG. 1. In addition, due to attraction and repulsion between the stator core 85 and the permanent magnets 84, fluctuations also occur in torque in a radial direction R shown in FIG. 1. This excitation force in the radial direction R is a radial excitation force. When the rotor 82 oscillates by these excitation forces, an audible sound may be generated. The audible sound may be unpleasant to a user, and thus, it is desirable to reduce these excitation forces. Torque ripple which is a circumferential excitation force greatly contributes to audible sounds, and in the present embodiment, torque ripple is reduced by generating torque that cancels out the torque ripple. The above-described corrected current instruction Idq** is an instruction in which a correction current instruction Idqh* for generating torque for canceling out torque ripple is superimposed on a base current instruction Idq*.

As shown in FIG. 2, the rotating electrical machine control device 10 of the present embodiment includes the correction current instruction setting part 6 that sets a correction current instruction Idqh* to be superimposed on a base current instruction Idq* to reduce torque ripple of the rotating electrical machine 80. The correction current instruction setting part 6 is configured to include a map (Harmonic MAP) that uses a torque instruction T* and a magnetic pole position θ as arguments.

As described above, a d-axis correction current instruction Idh* and a q-axis correction current instruction Iqh* are superimposed on a d-axis base current instruction Id* and a q-axis base current instruction Iq*, respectively, which are set by the torque control part 1. The current control part 2 computes a d-axis voltage instruction Vd* based on deviation between a corrected d-axis current instruction Id** and a d-axis current Id and rotational speed (angular velocity ω), and computes a q-axis voltage instruction Vq* based on deviation between a corrected q-axis current instruction Iq and a q-axis current Iq and the rotational speed (angular velocity ω). By this, the rotating electrical machine 80** can output torque with reduced torque ripple.

Figure 4:
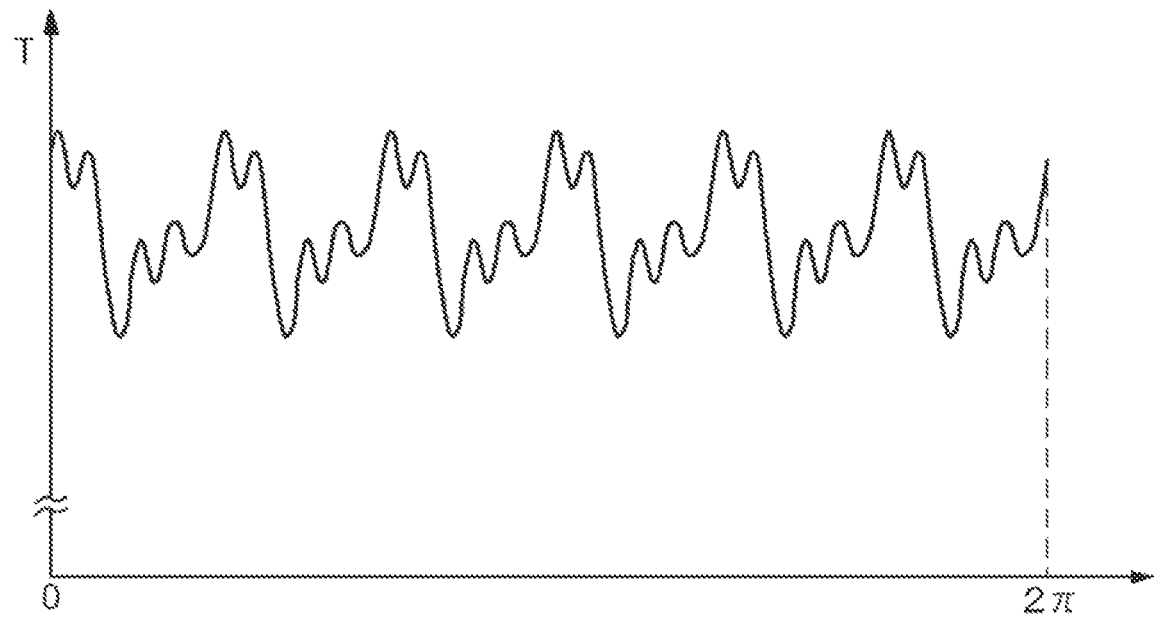
FIG. 4 is a waveform diagram showing an example of actual torque of a rotating electrical machine.

Correction torque for reducing an excitation force is torque in opposite phase to a (2NM)th-order harmonic torque component (M is any natural number) of a circumferential excitation force among harmonic torque components (torque ripple) extracted from actual torque T of the rotating electrical machine 80 such as that shown in FIG. 4. In the present embodiment, N representing the number of phases of alternating current is 3, and thus, for example, in a case of "M=1", torque in opposite phase to a sixth-order harmonic torque component among harmonic torque components extracted from the actual torque T is correction torque. A solid-line waveform of FIG. 5 represents a (2NM)th-order harmonic torque component (torque ripple) extracted from the actual torque T shown in FIG. 4, and a dashed dotted line waveform represents correction torque in opposite phase to the (2NM)th-order harmonic torque component.

The phase of the correction current instruction Idqh* is set such that the phase of correction torque differs from the phase of torque ripple by 180 degrees. In addition, in an example shown in FIG. 5, the amplitude of the torque ripple is equal to the amplitude of the correction torque. As such, when the phase of the torque ripple and the phase of the correction torque differ from each other by 180 degrees and their amplitudes are equal to each other, the correction torque and the torque ripple cancel each other out, reducing almost all torque ripple.

Figure 5:
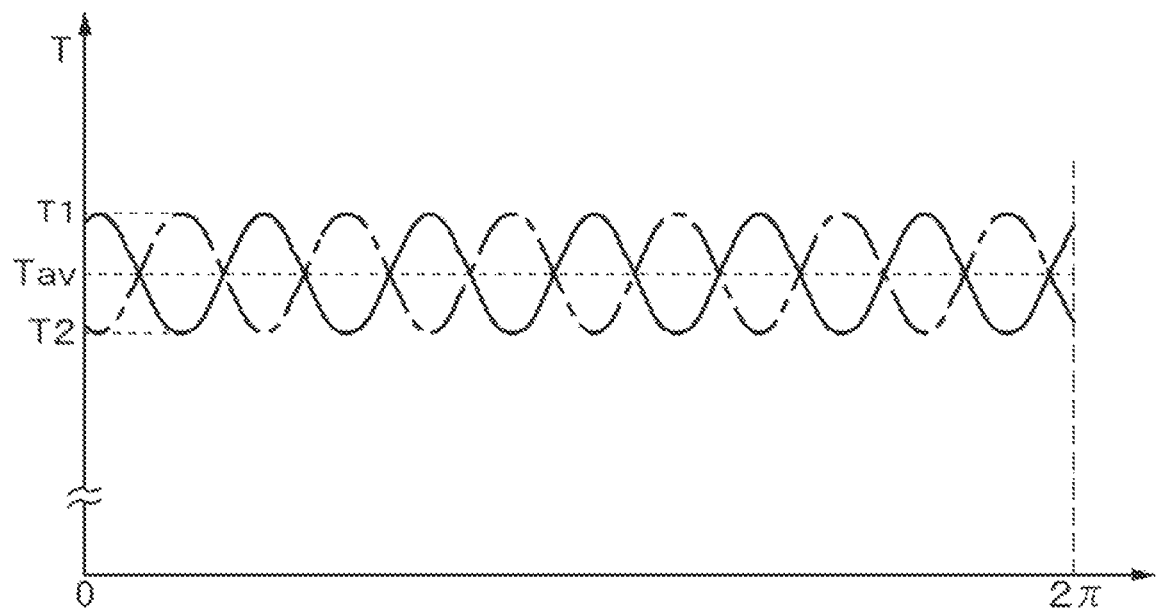
FIG. 5 is a waveform diagram showing an example of a harmonic ripple component and ripple reduction torque in opposite phase.

Here, as shown in FIG. 5, a peak value on a larger side of the correction torque is first torque T1, a peak value on a smaller side of the correction torque is second torque T2, and an average value of the correction torque is average correction torque Tav. The average correction torque Tav corresponds to a direct-current component of the correction torque or the actual torque T of the rotating electrical machine 80. When current feedback control based on a torque instruction T* is appropriately performed, the output torque of the rotating electrical machine 80 has a value substantially equal to the torque instruction T* (target torque) without being affected by the correction torque.

Meanwhile, as described above, the base current instruction Idq* is direct current, but the correction current instruction Idqh* is alternating current. Thus, the corrected current instruction Idq has a direct-current component and an alternating-current component. The common current control part 2** is configured to include a proportional-integral controller (PI), but the proportional-integral controller has limitations on responsiveness to high frequencies. That is, there is a possibility that for an alternating-current component corresponding to the correction current instruction Idqh*, current control may not sufficiently follow. Hence, in the present embodiment, the current control part 2 includes a first current control part 20 that performs current control on a direct-current component corresponding to the base current instruction Idq*; and a second current control part 21 that performs current control on an alternating-current component corresponding to the correction current instruction Idqh*. The first current control part 20 includes a proportional-integral controller (PI) as with a common current control part.

The second current control part 21 performs current control on the correction current instruction Idqh* by coordinate-transforming an alternating-current component corresponding to the correction current instruction Idqh* into a direct-current component and performing proportional-integral control, and inversely coordinate-transforming the direct-current component into an alternating-current component. As shown in FIG. 3, the second current control part 21 performs current control on the correction current instruction Idqh* by coordinate-transforming an alternating-current component corresponding to the correction current instruction Idqh* from the d-q-axis orthogonal vector coordinate system to a γ-δ-axis orthogonal coordinate system and allowing the alternating-current component to pass through a low-pass filter, and then performing proportional-integral control and inversely coordinate-transforming the alternating-current component from the γ-δ-axis orthogonal coordinate system to the d-q-axis orthogonal vector coordinate system. The second current control part 21 has two systems (a path from 22 to 25 and a path from 26 to 29) so as to handle respective cases in which a d-q-axis current Idq is advanced in phase with respect to the correction current instruction Idqh, and in which the d-q-axis current Idq is delayed in phase with respect to the correction current instruction Idqh. Reference signs "22" and "26" indicate coordinate transforming parts, "23" and "27" indicate low-pass filters (LPFs), "24" and "28" indicate proportional-integral controllers (PIs), and "25" and "29" indicate inverse coordinate transforming parts.

Figure 6:
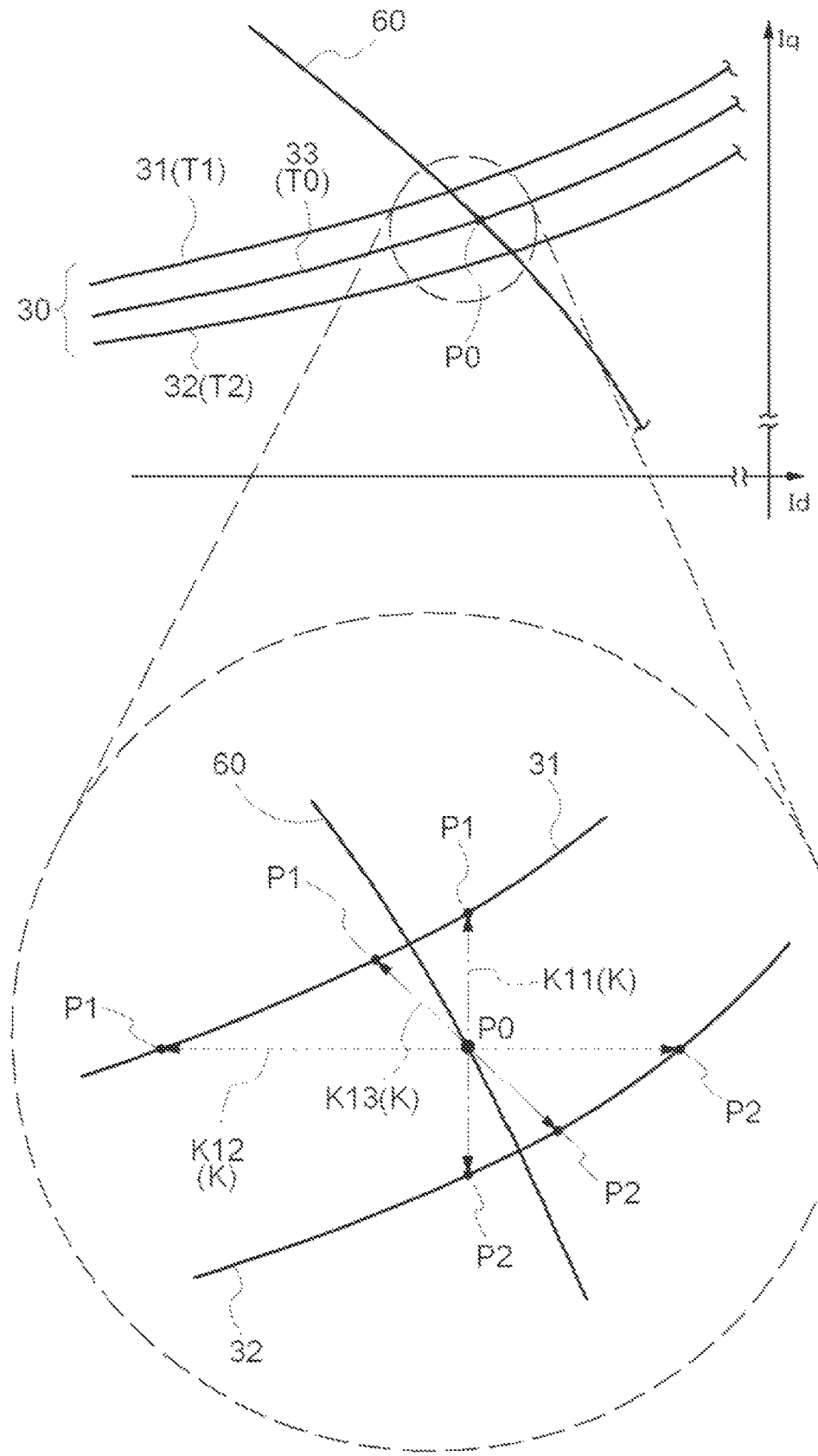
FIG. 6 is a diagram showing a relationship between torque and a current instruction in a d-q-axis orthogonal coordinate system.

FIG. 6 shows a relationship between torque and the base current instruction Idq* in the d-q-axis orthogonal coordinate system. Curves represented by reference sign "30" in FIG. 6 each are an equal torque line representing a combination of a d-axis current and a q-axis current (a vector locus of currents in the d-q-axis orthogonal vector coordinate system) that can output constant torque in the d-q-axis orthogonal vector coordinate system. Reference sign "31" indicates a first equal torque line which is an equal torque line 30 of the above-described first torque T1, and reference sign "32" indicates a second equal torque line which is an equal torque line 30 of the second torque T2. In addition, reference sign "33" indicates a reference equal torque line which is an equal torque line 30 of reference torque T0 corresponding to the above-described target torque (torque instruction T*) of the rotating electrical machine 80.

Reference sign "60" indicates a basic control line representing a combination of a d-axis current and a q-axis current (a vector locus of currents in the d-q orthogonal vector coordinate system) used upon controlling the rotating electrical machine 80 under standard conditions (hereinafter, this control is referred to as "basic control"). In general, the basic control line 60 is a vector locus representing an optimal combination of a d-axis current and a q-axis current for outputting any torque in the d-q-axis orthogonal vector coordinate system. As an example, the basic control line 60 can be a maximum torque line or a maximum efficiency line representing a vector locus of a combination of a d-axis current and a q-axis current that can output each torque with the highest efficiency. It can be said that the torque control part 1 is a functional part that sets a base current instruction Idq* indicating such a vector locus.

For example, when a reduction of torque ripple is not considered, i.e., when a d-axis base current instruction Id* and a q-axis base current instruction Iq* are simply set based on a torque instruction T*, a current value at a reference point P0 shown in FIG. 6 is set. The reference point P0 is a point of intersection of the basic control line 60 and an equal torque line corresponding to the torque instruction T* (target torque) (in this case, the reference equal torque line 33) in the d-q-axis orthogonal vector coordinate system. In the present embodiment, to reduce torque ripple, as described above with reference to FIG. 5, a correction current instruction Idqh* that can output correction torque is superimposed on a d-axis base current instruction Id* and a q-axis base current instruction Iq*. That is, a d-axis correction current instruction Idh* and a q-axis correction current instruction Iqh* that include alternating-current components (here, (2NM)th-order harmonic components) are superimposed on a d-axis base current instruction Id* and a q-axis base current instruction Iq* (a current instruction Idq* based on a torque instruction T*), respectively, which are direct-current components, in the d-q-axis orthogonal vector coordinate system.

For example, the correction torque is torque that oscillates between the first torque T1 and the second torque T2 via the average correction torque Tav (reference torque T0). A vector locus, in the d-q-axis orthogonal vector coordinate system, of a d-axis correction current instruction Idh* and a q-axis correction current instruction Iqh* for outputting correction torque is a straight line (line segment) that passes through the reference point P0 and connects, for example, the first equal torque line 31 to the second equal torque line 32. The straight line passing through the reference point P0 is hereinafter referred to as correction straight line K. In addition, a point of intersection of the first equal torque line 31 and the correction straight line K is referred to as first point of intersection P1, and a point of intersection of the second equal torque line 32 and the correction straight line K is referred to as second point of intersection P2.

In principle, the correction straight line K can be set limitlessly. FIG. 6 exemplifies three correction straight lines K (K11, K12, and K13). A first correction straight line K11 represents a mode in which torque is changed by changing a current along the q-axis, a second correction straight line K12 represents a mode in which torque is changed by changing a current along the d-axis, and a third correction straight line K13 represents a mode in which torque is changed by changing a current in a slanting direction relative to the d-axis and the q-axis.

When a vector locus of a correction current instruction Idqh* is the first correction straight line K11, the correction current instruction Idqh* includes only a q-axis correction current instruction Iqh*. Since the first correction straight line K11 is parallel to the q-axis, a d-axis correction current instruction Idh* has a constant value and the value is the value of a d-axis base current instruction Id* based on a torque instruction T* (the value of a d-axis current at the reference point P0). When a vector locus of a correction current instruction Idqh* is the second correction straight line K12, the correction current instruction Idqh* includes only a d-axis correction current instruction Idh*. Since the second correction straight line K12 is parallel to the d-axis, a q-axis correction current instruction Iqh* has a constant value and the value is the value of a q-axis current at the reference point P0. When a vector locus of a correction current instruction Idqh* is the third correction straight line K13, the correction current instruction Idqh* includes both a d-axis correction current instruction Idh* and a q-axis correction current instruction Iqh*.

The correction current instruction Idqh* can be set for a plurality of (2NM)th-order harmonic torque components which are reduction targets. In addition, the correction straight line K may vary depending on the order of harmonic torque components. In the present embodiment, a 6th-order harmonic torque component and a 12th-order harmonic torque component are reduction targets. For the 6th-order harmonic torque component, the first correction straight line K11 is set, and for the 12th-order harmonic torque component, the third correction straight line K13 is set.

Figure 7:
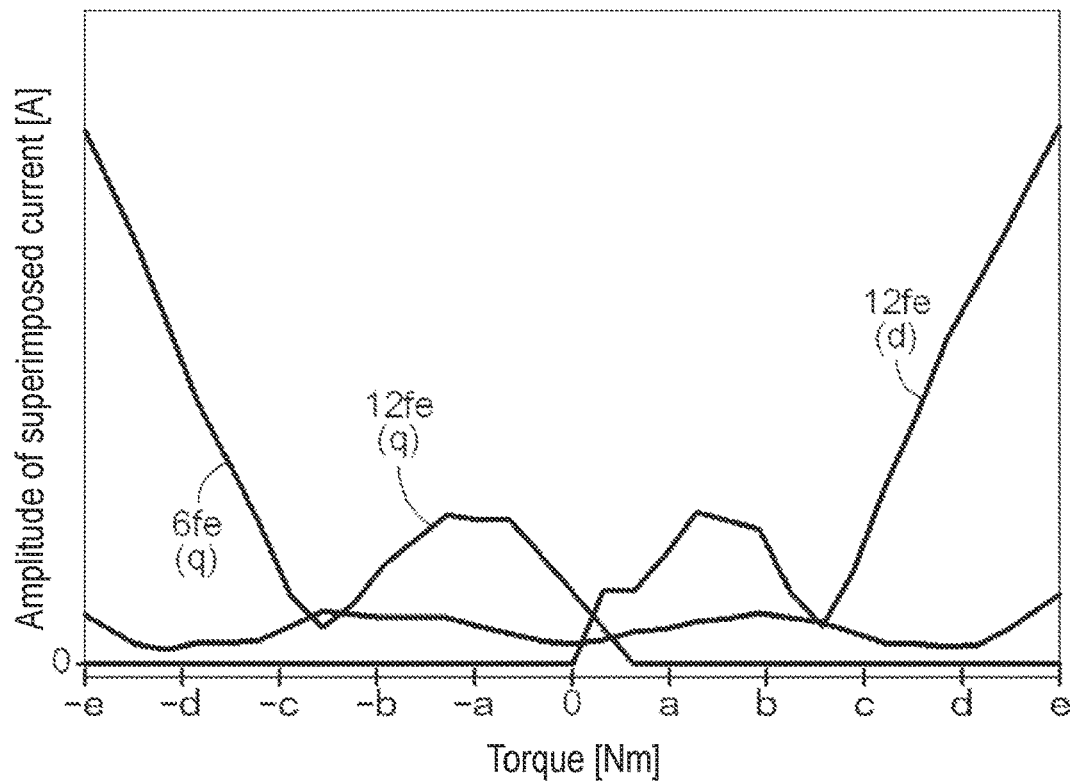
FIG. 7 is a graph showing a relationship between the amplitude of superimposed current and torque.
Figure 8:
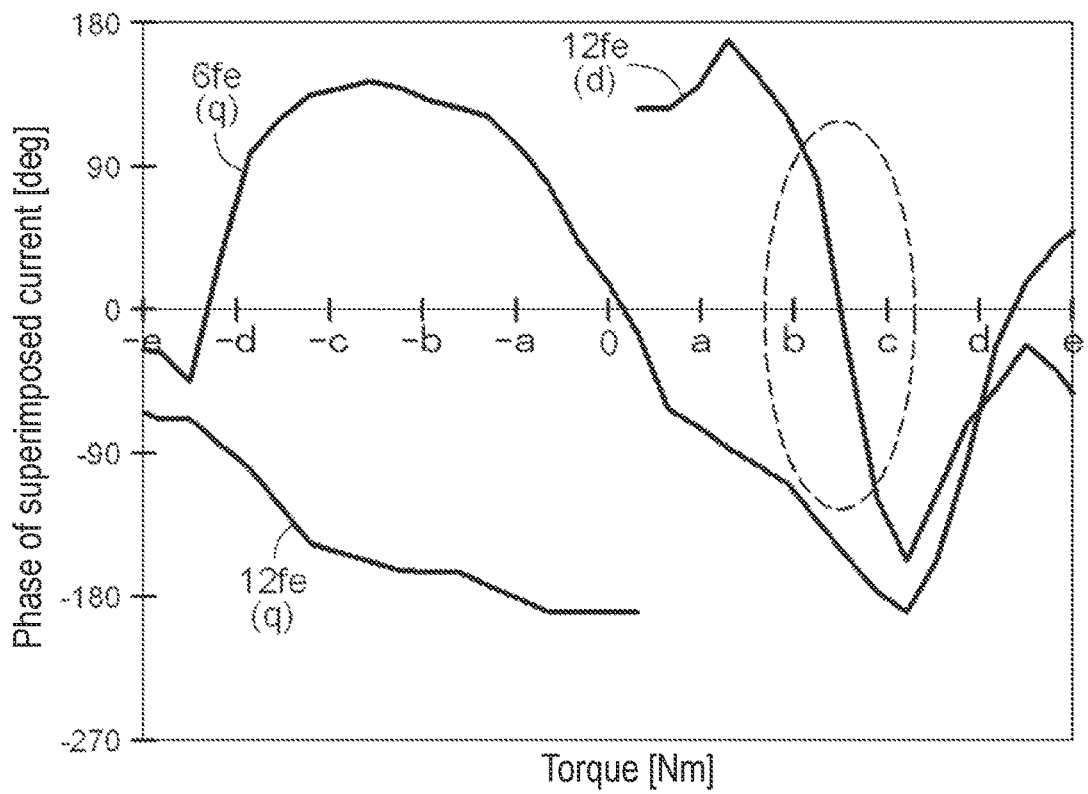
FIG. 8 is a graph showing a relationship between the phase of superimposed current and torque.

In addition, as shown in FIGS. 7 and 8, the amplitude and phase of the correction current instruction Idqh* vary depending on the torque (torque instruction T*) of the rotating electrical machine 80. A graph of FIG. 7 shows a relationship between the amplitude of the correction current instruction Idqh* and torque (torque instruction T*), and a graph of FIG. 8 shows a relationship between the phase of the correction current instruction Idqh* and torque (torque instruction T*). In the drawings, "fe" indicates electrical angle frequency, "6fe" indicates a 6th-order harmonic, and "12fe" indicates a 12th-order harmonic. In addition, "d" in parentheses indicates a d-axis correction current instruction Idh* and "q" in parentheses indicates a q-axis correction current instruction Iqh*. As such, the correction current instruction Idqh* is alternating current having a frequency determined based on torque ripple of a reduction target, and having a phase and an amplitude that vary depending on the torque instruction T* for the rotating electrical machine 80.

Figure 9:
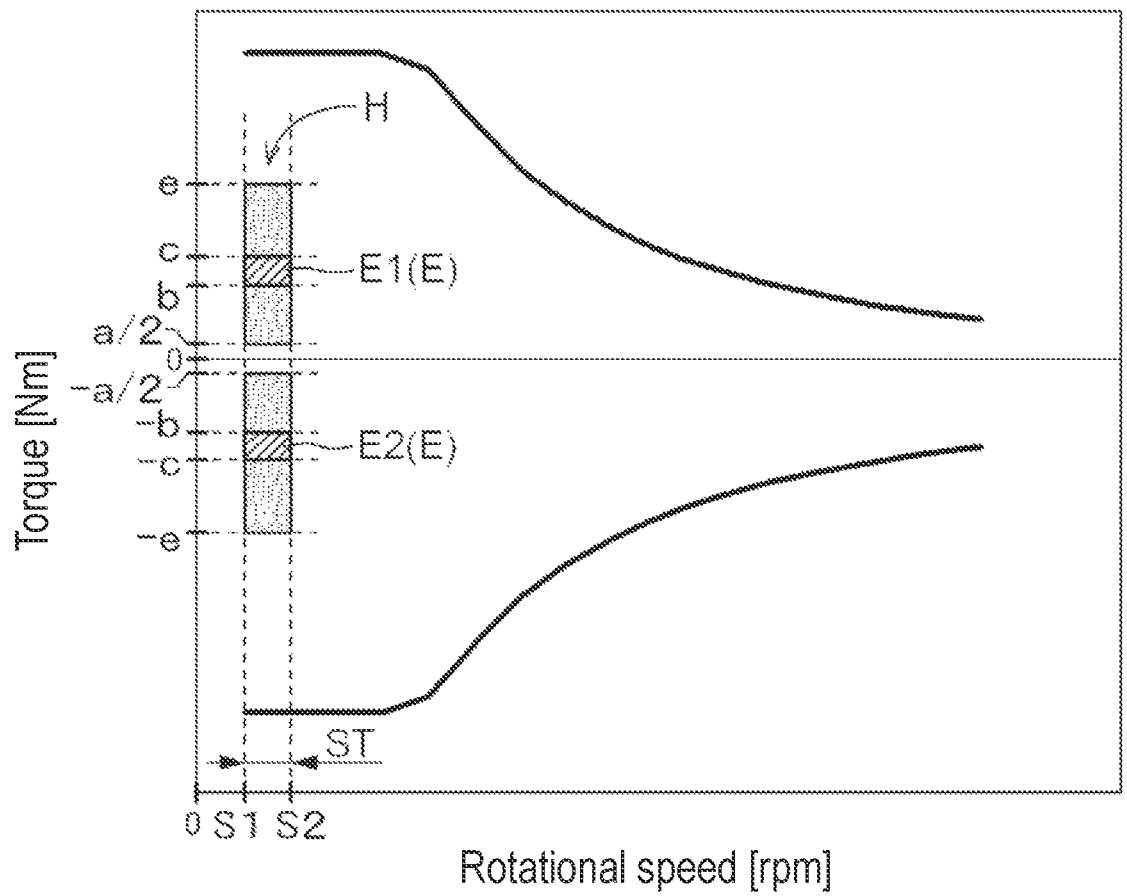
FIG. 9 is a diagram showing an operating range of the rotating electrical machine based on torque and rotational speed.

Meanwhile, correction torque is outputted to suppress oscillation which is caused by torque ripple from becoming an audible sound. The frequency of torque ripple varies depending on the rotational speed of the rotating electrical machine 80, and frequencies that generate audible sounds are on the order of 20 [Hz] to 20 [kHz], and particularly, a frequency of 1 [kHz] or lower is unpleasant to humans. Thus, in the present embodiment, when the rotational speed of the rotating electrical machine 80 is a predetermined correction target rotational speed, the correction current instruction setting part 6 sets a correction current instruction Idqh*. FIG. 9 shows an operating range of the rotating electrical machine 80 based on torque and rotational speed. In the operating range, a correction target rotational speed ST is set between a first target rotational speed S1 and a second target rotational speed S2.

The frequency of oscillation caused by torque ripple is determined by the following equation (1) based on the structure (the number of pole pairs) of the rotor 82, the rotational speed of the rotor 82, and the frequency of a harmonic of the torque ripple. In the present embodiment, the rotor 82 of the rotating electrical machine 80 has four pole pairs. Here, when the rotational speed of the rotating electrical machine 80 is 1000 [rpm], the frequency of oscillation caused by the 6th-order harmonic is 400 [Hz] as shown in the following equation (2), and the frequency of oscillation caused by the 12th-order harmonic is 800 [Hz] as shown in the following equation (3).

Oscillation frequency [Hz]=rotational speed [rpm]·
(the number of pole pairs/60 [sec])·2MN         (1)

400 [Hz]=1000 [rpm]·(1/60 [sec])·6              (2)

800 [Hz]=1000 [rpm]·(1/60 [sec])·12             (3)

Thus, in a case of the rotating electrical machine 80 having the rotor 82 with four pole pairs as in the present embodiment, the correction target rotational speed ST is set, including 1000 [rpm].

In addition, when torque is small, torque ripple is also small and thus audible sound noise is also small, and when torque is large, the influence of audible sound noise caused by torque ripple is relatively small. Thus, when the torque (torque instruction T*) of the rotating electrical machine 80 is predetermined correction target torque, the correction current instruction setting part 6 sets a correction current instruction Idqh*. In the present embodiment, when the absolute value of torque is correction target torque ranging from "a/2" to "e" in the operating range shown in FIG. 9, a correction current instruction Idqh* is set. As shown in FIG. 9, in the present embodiment, the correction current instruction Idqh* is set such that correction torque is outputted in a correction target operating range H which is set based on the rotational speed and torque (torque instruction T*) of the rotating electrical machine 80.

As such, by not superimposing the correction current instruction Idqh* in the entire operating range of the rotating electrical machine 80, a reduction in efficiency caused by superimposing the correction current instruction Idqh* is suppressed. In addition, in an operating range in which torque ripple needs to be suppressed, the correction current instruction Idqh* is superimposed, by which the torque ripple is appropriately suppressed.

Meanwhile, it can be seen, by referring to FIG. 8, that when the torque of the rotating electrical machine 80 changes between "b" and "c", a change in the phase of a correction current instruction Idqh* (a d-axis correction current instruction Idh* for the 12th-order harmonic) is large compared to when the torque changes at other points. The phase of the correction current instruction Idqh* is set such that torque (correction torque) outputted based on the correction current instruction Idqh* is opposite in phase to torque ripple. That is, as described above with reference to FIG. 5, the phase of the correction current instruction Idqh* is set such that the phase of correction torque differs from the phase of torque ripple by 180 degrees. Hence, if the phase of the correction current instruction Idqh* differs from an appropriate phase, then a phase difference between the phase of correction torque and the phase of torque ripple is out of 180 degrees, reducing a torque ripple reduction effect. For example, when the phase of the correction current instruction Idqh* is shifted by 180 degrees from an appropriate phase, the phase of correction torque matches the phase of torque ripple and the torque ripple is increased by twice, which may oscillate the rotating electrical machine 80.

As shown in FIG. 8, when torque changes between "b" and "c", the phase of the d-axis correction current instruction Idh* for the 12th-order harmonic changes by more than or equal to 180 degrees. For example, when the torque of the rotating electrical machine 80 increases from "b" to "c" upon acceleration of the vehicle, etc., the phase of the d-axis correction current instruction Idh* for the 12th-order harmonic changes by more than or equal to 180 degrees. Here, if there is a large delay in setting a correction current instruction Idqh* by the correction current instruction setting part 6 after a change in a torque instruction T* or a large response delay in the current control part 2, then correction torque based on the correction current instruction Idqh* may increase torque ripple, oscillating the rotating electrical machine 80.

Hence, in the present embodiment, in an operating range in which the phase of the correction current instruction Idqh* thus suddenly changes relative to a change in torque, particularly, in an operating range corresponding to an inflection point at which the phase is reversed relative to a change in torque, control for reducing torque ripple by correction torque is limited. In a specific operating range E (see FIG. 9) which is such an operating range, the correction current instruction setting part 6 reduces the amplitude of the correction current instruction Idqh*. For example, the correction current instruction setting part 6 can also substantially prohibit correction by setting the amplitude of the correction current instruction Idqh* to zero.

The specific operating range E is set based on the torque instruction T*. For example, an operating range in which torque (torque instruction T*) is "b" to "c" and an operating range in which torque (torque instruction T*) is "-b" to "-c" such as those shown in FIG. 9 are set as specific operating ranges E. Although FIG. 9 exemplifies a mode in which torque that identifies a first specific operating range E1 used upon motoring and torque that identifies a second specific operating range E2 used upon regeneration have the same absolute value, the absolute value of torque may differ between when motoring is performed and when regeneration is performed. In addition, it does not inhibit setting of a specific operating range E only for either one of when motoring is performed and when regeneration is performed, e.g., only for when motoring is performed.

Note that in the present embodiment, a specific operating range E is set in an operating range in which the amount of change in the phase of the correction current instruction Idqh* relative to a change in the torque instruction T* is greater than or equal to a predetermined value which is determined in advance. As described above, when the amount of change in phase increases, a difference between the phase of torque ripple of a reduction target and the phase of correction torque becomes smaller than 180 degrees, reducing the torque ripple reduction effect. A shift in the phase of the correction torque relative to the phase of the torque ripple is more likely to occur when the amount of change in the phase of the correction current instruction Idqh* is more sudden, and the shift in the phase also increases. That is, the larger the amount of change in the phase of the correction current instruction Idqh* relative to a change in the torque instruction T*, the smaller the torque ripple reduction effect, and reversely, the torque ripple may even increase.

Thus, it is desirable that the specific operating range E be set so as at least not to increase torque ripple. When the amount of change in the phase of the correction current instruction Idqh* relative to a change in the torque instruction T* is relatively small, even if there is a delay in following the change in the correction current instruction Idqh*, a shift in the phase of correction torque relative to the phase of torque ripple is small. On the other hand, when the amount of change in the phase of the correction current instruction Idqh* relative to a change in the torque instruction T* is relatively large, if there is a delay in following the change in the correction current instruction Idqh*, then a shift in the phase of correction torque relative to the phase of torque ripple is also large, increasing the possibility of a reduction in the torque ripple reduction effect or an increase in torque ripple. For example, a predetermined value is set such that the amount of change in the phase of the correction current instruction Idqh* is on the order of 5 degrees to 10 degrees with respect to a change of "1" in the torque instruction T*, and when the amount of change is greater than or equal to the predetermined value, superimposing of the correction current instruction Idqh* is limited, by which amplification of torque ripple is suppressed, and when the torque ripple suppression effect is small, the correction current instruction Idqh* is superimposed, by which a reduction in an effect of controlling the rotating electrical machine 80 can be suppressed.

Limiting the superimposing of the correction current instruction Idqh* on the base current instruction Idq* so that correction torque is not generated results from, as described above, the responsiveness of the correction current instruction setting part 6 and the current control part 2. That is, it results from convergence time for a change in the torque instruction T* (target torque) that is time required for the phase of the correction current instruction Idqh* to follow a phase determined based on the changed torque instruction T* (target torque). Thus, it is preferred that a specific operating range E be set based on an operating range in which when a maximum amount of change in torque that can occur within the convergence time has occurred, torque ripple (torque oscillation) is amplified by the correction current instruction Idqh*.

When the specific operating range E is set in such a manner, in an operating range in which control can follow, torque ripple is appropriately reduced, and in an operating range in which it is difficult for control to follow, torque ripple can be prevented from being amplified by correction torque.

Figure 10:
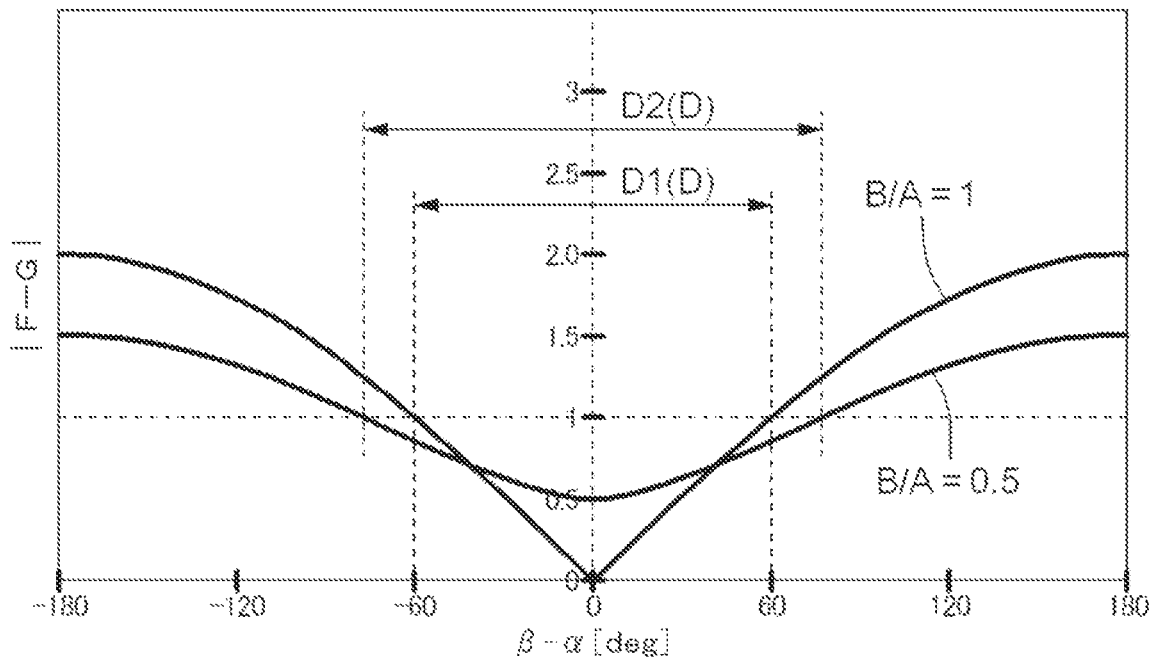
FIG. 10 is a graph showing a relationship between a torque ripple reduction effect and a phase difference.

A graph of FIG. 10 shows a relationship between the torque ripple reduction effect and a phase difference between torque ripple and correction torque. In addition, the following equations (4) and (5) schematically represent torque ripple and correction torque. Equation (4) represents torque ripple "F" and equation (5) represents correction torque "G". Note that "π" in equation (5) is 180 degrees, and it indicates that when "α" and "β" are identical, torque ripple and correction torque are in opposite phase (the phase difference is 180 degrees).

$$F = A \cos(\omega t + \alpha) \tag{4}$$

$$G = B \cos(\omega t + \beta + \pi) \tag{5}$$

A vertical axis of the graph of FIG. 10 represents the absolute value of a value (|F−G|) obtained by subtracting the correction torque "G" from the torque ripple "F", and a horizontal axis represents the phase difference (β−α) between the torque ripple "F" and the correction torque "G". In addition, FIG. 10 shows two characteristic curves, and one of the characteristic curves represents a case in which the torque ripple "F" and the correction torque "G" have the same amplitude (A=B) and the amplitude ratio (B/A) is "1". The other characteristic curve represents a case in which the amplitude of the correction torque "G" is "½" that of the torque ripple "F" (B=A/2) and the amplitude ratio (B/A) is "0.5".

When the amplitude "A" of torque ripple (torque oscillation) of a reduction target is identical to the amplitude "B" of correction torque determined based on the correction current instruction Idqh* and "α" and "β" match each other, a vector of the torque ripple and a vector of the correction torque have the same magnitude and opposite directions, and the magnitude of a synthetic vector is zero. The magnitude of the synthetic vector represents the magnitude of torque ripple remaining after providing the correction torque. When "α" and "β" match each other, the torque ripple reduction effect brought about by the correction torque is maximum, and the torque ripple can be canceled out by the correction torque.

When there is a difference between "α" and "β", the magnitude of the synthetic vector increases as the difference increases. That is, the magnitude of the remaining torque ripple increases. When the difference between "α" and "β" is ±60 degrees, the magnitude of the synthetic vector is identical to the magnitude of the original torque ripple. That is, when the difference between "α" and "β" is ±60 degrees, there is no torque ripple reduction effect. When the difference between "α" and "β" is greater than ±60 degrees, the magnitude of the synthetic vector exceeds the magnitude of the original torque ripple. That is, by providing the correction torque, the torque ripple is amplified. Thus, as shown in FIG. 10, a torque ripple correctable range D for a case in which the amplitude of the torque ripple is identical to the amplitude of the correction torque is a first correctable range D1 in which the difference between "α" and "β" is within ±60 degrees.

On the other hand, when the amplitude of the correction torque is "½" that of the torque ripple and "α" and "β" match each other, the magnitude of the vector of the correction torque is "½" that of the vector of the torque ripple and the vectors have opposite directions, and the magnitude of a synthetic vector is "½" that of the torque ripple. That is, when the amplitude of the correction torque is "½" that of the torque ripple, even when the torque ripple reduction effect brought about by the correction torque is maximum, the torque ripple cannot be completely canceled out by the correction torque, and even if the correction torque is provided, the torque ripple remains. That is, when the amplitude of the correction torque is "½" that of the torque ripple, the torque ripple reduction effect is small compared to when the amplitude of the torque ripple is identical to the amplitude of the correction torque. Note, however, that as will be described later, a torque ripple correctable range D is wide compared to when the amplitude of the torque ripple is identical to the amplitude of the correction torque.

When there is a difference between "α" and "β", as with a case in which the amplitude of the torque ripple is identical to the amplitude of the correction torque, the magnitude of a synthetic vector increases as the difference increases. That is, the magnitude of remaining torque ripple increases. When the difference between "α" and "β" is ±60 degrees, the magnitude of the synthetic vector is about 0.87 (=($3^{1/2}$)/2). When the difference between "α" and "β" is on the order of +80 degrees, there is no torque ripple reduction effect, and when the difference between "α" and "β" is greater than that, the magnitude of the synthetic vector exceeds the magnitude of the original torque ripple. That is, by providing the correction torque, the torque ripple is amplified.

As shown in FIG. 10, a torque ripple correctable range D for a case in which the amplitude of the correction torque is "½" that of the torque ripple is a second correctable range D2 in which the difference between "α" and "β" is approximately within ±80 degrees. The second correctable range D2 is a wide range compared to the first correctable range D1. As such, when the amplitude of the correction torque is smaller than the amplitude of the torque ripple, the torque ripple reduction effect is small compared to when the amplitude of the torque ripple is identical to the amplitude of the correction torque, but a range in which even if a shift in phase occurs, the torque ripple reduction effect is obtained increases.

When the torque ripple reduction effect is given priority, in one aspect, it is preferred that the amplitude of torque ripple of a reduction target be identical to the amplitude of correction torque determined based on a correction current instruction Idqh*, and a predetermined value that specifies the amount of change in the phase of the correction current instruction Idqh* be ±60 degrees.

When the amplitude "A" of torque ripple of a reduction target is identical to the amplitude "B" of correction torque determined based on a correction current instruction Idqh*, the greatest reduction effect can be obtained. Note, however, that when the phase of optimal correction torque is shifted, the reduction effect decreases as the shift increases, and when the shift in the phase exceeds 60 degrees, the torque ripple is amplified. Thus, by setting the preset value to 60 degrees and setting, as a specific operating range E, an operating range in which the amount of change in the phase of the correction current instruction Idqh* relative to a change in the torque instruction T* (target torque) is greater than or equal to the predetermined value, even if the torque instruction T* (target torque) is suddenly changed, the torque ripple is not amplified and can be appropriately reduced.

Note that as described above, since there is no torque ripple reduction effect at ±60 degrees, it is also preferred to set the preset value such that the preset value is in a range narrower than ±60 degrees when the amplitude of torque ripple of a reduction target is identical to the amplitude of correction torque determined based on a correction current instruction Idqh*. In this case, in an operating range in which the torque ripple reduction effect is small, the correction current instruction Idqh* is not superimposed, and thus, the rotating electrical machine control device 10 can control the rotating electrical machine 80 with high efficiency.

To summarize the above, a specific operating range E can be set in accordance with the following condition. It is assumed that an operating point in the d-q-axis orthogonal coordinate system moves from pre-movement torque $T_{bfr}$ [Nm] to post-movement torque $T_{aft}$ [Nm]. Here, it is assumed that the response rate of torque is Ta [Nm/s] and the convergence time of the correction current instruction Idqh* is t [ms]. It is assumed that torque that can be changed during the convergence time "t [ms]" is "Ta·t", and the differential torque "ΔT [Nm]" between the pre-movement torque $T_{bfr}$ [Nm] and the post-movement torque $T_{aft}$ [Nm] corresponds to "Ta t". In addition, it is assumed that the phase of the correction current instruction Idqh* for the pre-movement torque $T_{bfr}$ [Nm] is "$\theta_{bfr}$" and the phase of the correction current instruction Idqh* for the post-movement torque $T_{aft}$ [Nm] is "$\theta_{aft}$". A specific operating range E is set in a torque range in which the absolute value "$|\theta_{aft}-\theta_{bfr}|$" of a difference between "$\theta_{bfr}$" and "$\theta_{aft}$" exceeds an allowable phase difference φ. Note that the allowable phase difference φ varies depending on a ratio between the amplitude of torque ripple and the amplitude of correction torque. As described above with reference to FIG. 10, when the ratio is "1", "φ=60 degrees".

Figure 11:
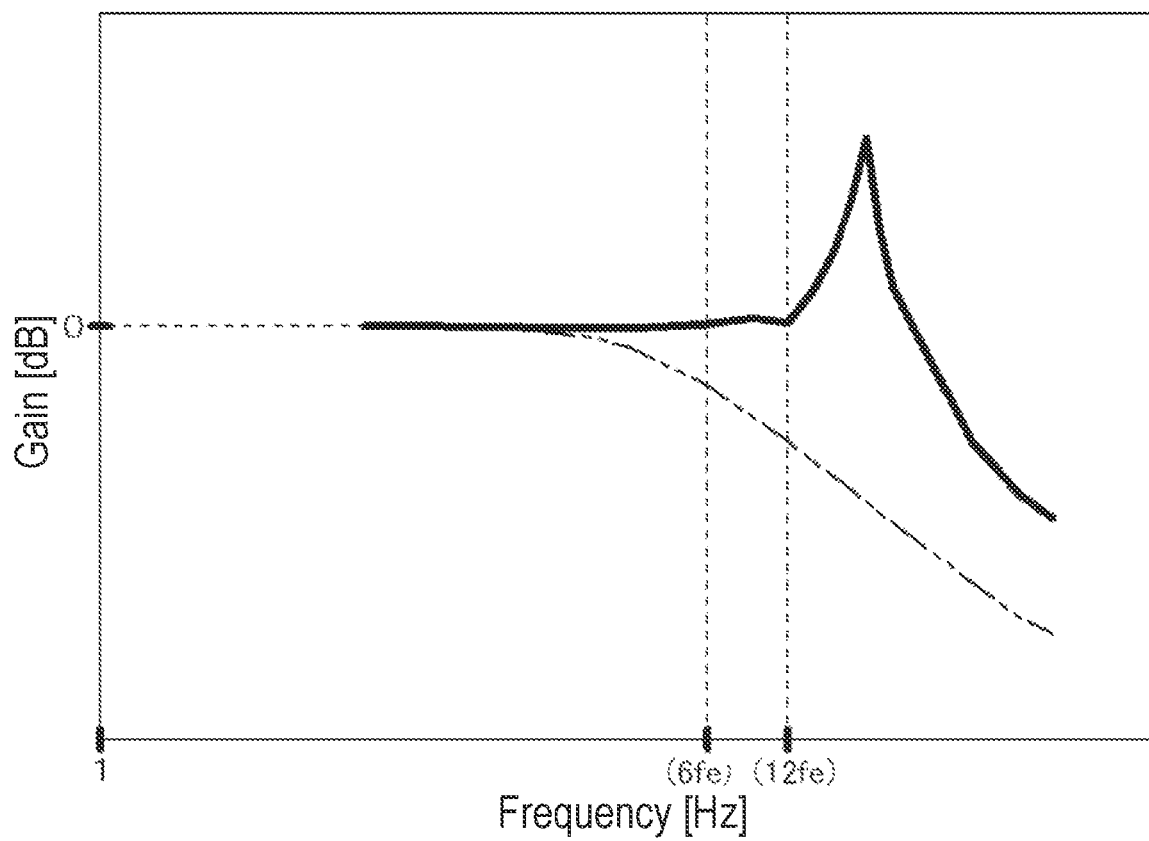
FIG. 11 is a characteristic diagram showing a relationship between frequency and gain in the current control part.

Meanwhile, as described above with reference to FIG. 3, in order to improve the responsiveness of current control for the correction current instruction Idqh* which is a harmonic component, the current control part 2 includes the second current control part 21. A graph of FIG. 11 shows frequency characteristics of the current control part 2, and a vertical axis represents gain and a horizontal axis represents frequency. Note that FIG. 11 is a semi-log graph in which the horizontal axis is a logarithmic axis (the same also applies to FIGS. 13 and 14). A dashed double-dotted line in FIG. 11 represents a frequency characteristic of only the first current control part 20, and a solid line represents a frequency characteristic of the entire current control part 2 in which the first current control part 20 and the second current control part 21 are put together. In addition, (6fe) in the drawing represents a frequency corresponding to a correction current instruction Idqh* for the 6th-order harmonic, and (12fe) represents a frequency corresponding to a correction current instruction Idqh* for the 12th-order harmonic.

As described above, the second current control part 21 is provided to improve the responsiveness of proportional-integral control for a correction current instruction Idqh* which is alternating current including a harmonic component. As shown in FIG. 11, in the frequency characteristic of only the first current control part 20, the gains at the frequencies corresponding to the correction current instruction Idqh* for the 6th-order harmonic and the correction current instruction Idqh* for the 12th-order harmonic are low, indicating that the responsiveness of current control for the correction current instructions Idqh* is not sufficient.

Figure 12:
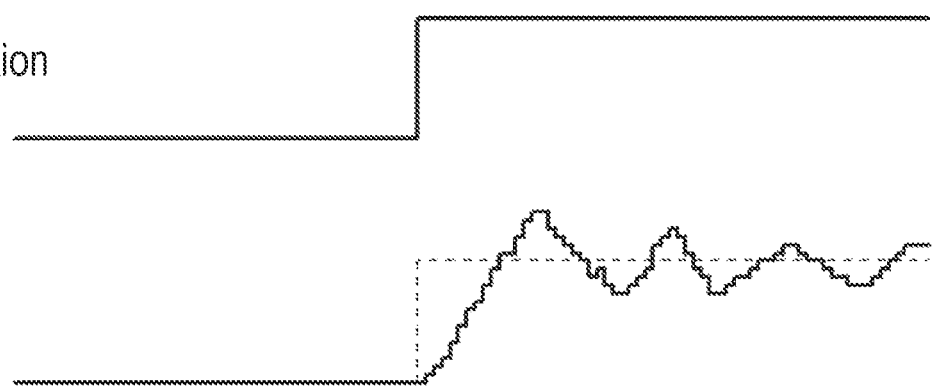
FIG. 12 is a waveform diagram showing an example of a relationship between a torque instruction and output torque.

On the other hand, in the frequency characteristic of the entire current control part 2 in which the first current control part 20 and the second current control part 21 are put together, the gains at the frequencies corresponding to the correction current instruction Idqh* for the 6th-order harmonic and the correction current instruction Idqh* for the 12th-order harmonic are not reduced, indicating that current control for the correction current instructions Idqh* has sufficient responsiveness. Note, however, that the gain greatly increases at frequencies higher than the frequency corresponding to the correction current instruction Idqh* for the 12th-order harmonic. For example, as shown in FIG. 12, when the torque instruction T* is suddenly increased like step response, the base current instruction Idq* also performs step response. Since the current control part 2 performs control at a high frequency determined based on a rise of step response, a large gain occurs as shown in FIG. 11. As a result, as shown in FIG. 12, overshoot may occur in output torque or oscillation may occur thereafter.

Figure 13:
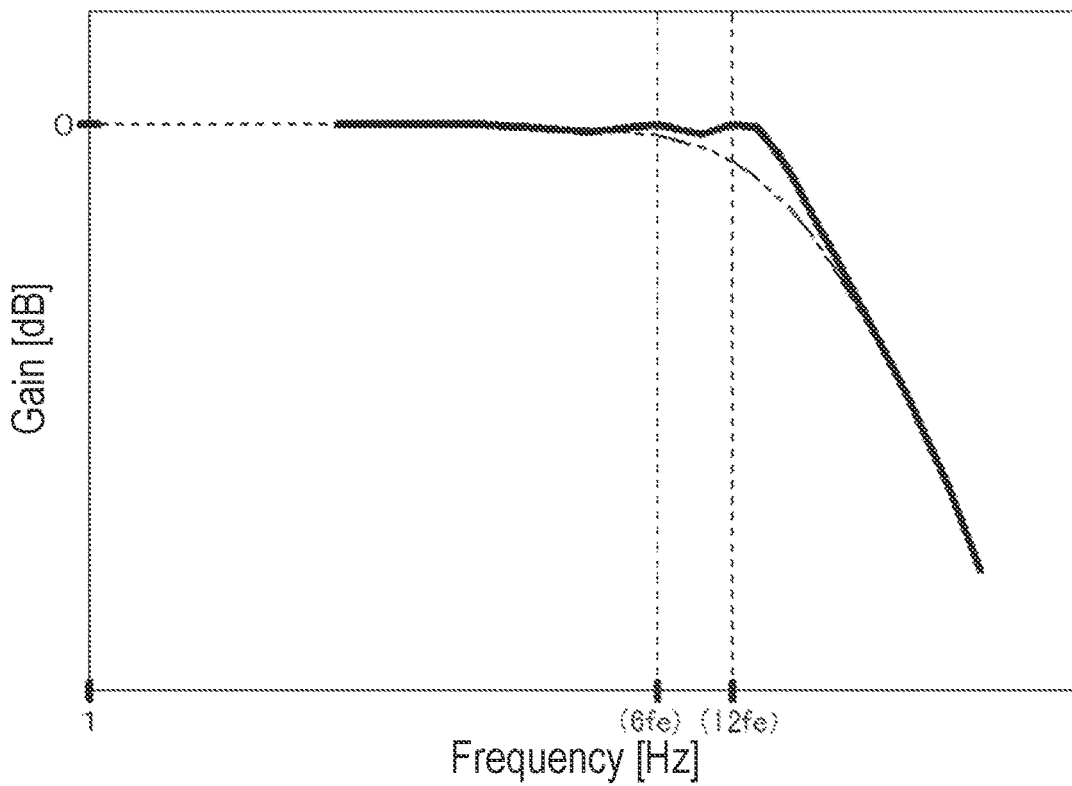
FIG. 13 is a characteristic diagram showing a relationship between frequency and gain in the current control part.
Figure 14:
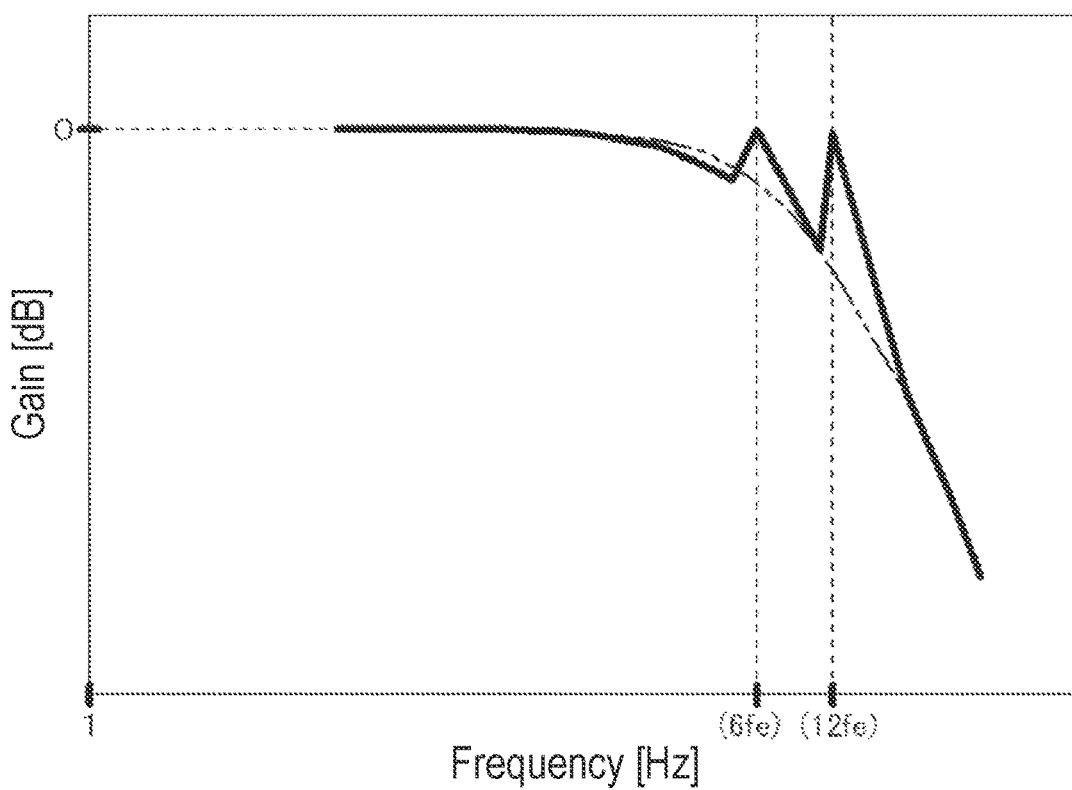
FIG. 14 is a characteristic diagram showing a relationship between frequency and gain in the current control part.

Hence, in the present embodiment, the gain of the second current control part 21 is set to be low compared to the gain of the first current control part 20. FIGS. 13 and 14 exemplify frequency characteristics for a case in which the gain of the second current control part 21 is set to be "⅙" that of the first current control part 20. FIG. 13 shows frequency characteristics in which the rotational speed of the rotating electrical machine 80 is near the first target rotational speed 51 of FIG. 9, and FIG. 14 shows frequency identification in which the rotational speed of the rotating electrical machine 80 is between the first target rotational speed 51 and the second target rotational speed S2 of FIG. 9. That is, FIG. 14 shows frequency characteristics with a higher rotational speed of the rotating electrical machine 80 over those of FIG. 13. The frequency corresponding to the correction current instruction Idqh* also depends on the rotational speed of the rotating electrical machine 80 (see equations (1) to (3)). Hence, the frequencies corresponding to the correction current instruction Idqh* for the 6th-order harmonic and the correction current instruction Idqh* for the 12th-order harmonic in FIG. 14 are also shifted toward a higher-frequency side compared to those of FIG. 13.

As shown in FIGS. 13 and 14, at frequencies that are control targets of the second current control part 21, an appropriate response is made, and an excess response at other frequencies is suppressed. Thus, even when the torque instruction T* (target torque) is suddenly changed, the rotating electrical machine 80 can be appropriately controlled without overshoot in output torque or oscillation thereafter.

When the gain of the second current control part 21 is thus set to be low compared to the gain of the first current control part 20, the responsiveness of current control for the correction current instruction Idqh* decreases, and thus, convergence time may increase. Hence, in the present embodiment, furthermore, there is provided a correction voltage instruction setting part 7 (Harmonic Voltage MAP) that sets a correction voltage instruction Vdqh* to be superimposed on a voltage instruction Vdq* by feedforward control to reduce torque ripple of the rotating electrical machine 80. As with the correction current instruction setting part 6, the correction voltage instruction setting part 7 includes a map. The map is set based on a steady-state value obtained after current control is performed by superimposing a correction current instruction Idqh* on a base current instruction Idq* and is converged by experiments or simulations.

By thus superimposing a correction voltage instruction Vdqh* on a voltage instruction Vdq* by feedforward control, convergence time for control performed by the current control part 2 is reduced, improving responsiveness. For example, even when the gain of the second current control part 21 is set to be low compared to that of the first current control part 20, a voltage instruction Vdq* including a correction voltage instruction Vdqh* for generating correction torque can be appropriately computed.

Note that the correction voltage instruction setting part 7 sets a correction voltage instruction Vdqh* based on a torque instruction T* and the rotational speed and magnetic pole position θ of the rotating electrical machine 80. Torque ripple occurs based on the output torque and rotational speed of the rotating electrical machine 80. Thus, since the correction voltage instruction Vdqh* is a voltage instruction for outputting correction torque for reducing torque ripple, the correction voltage instruction Vdqh* is appropriately set based on the torque instruction T* and the rotational speed of the rotating electrical machine 80.

Figure 15:
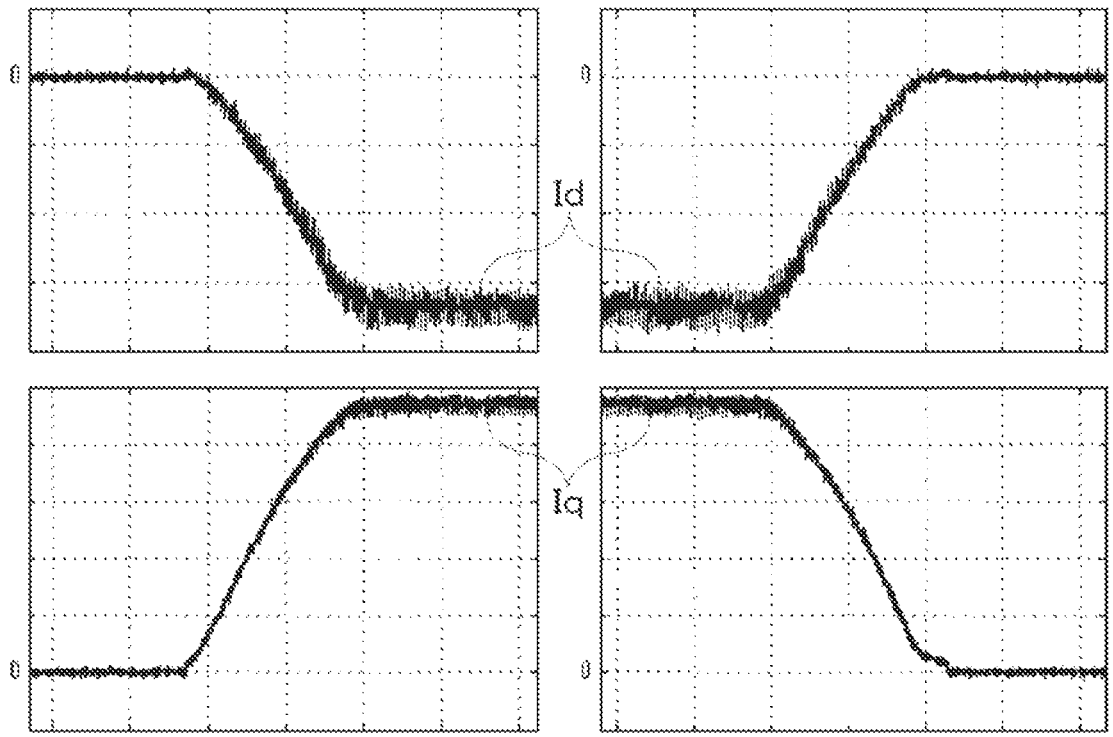
FIG. 15 is a waveform diagram showing an example of d-q-axis currents for a case in which a harmonic is not superimposed.
Figure 16:
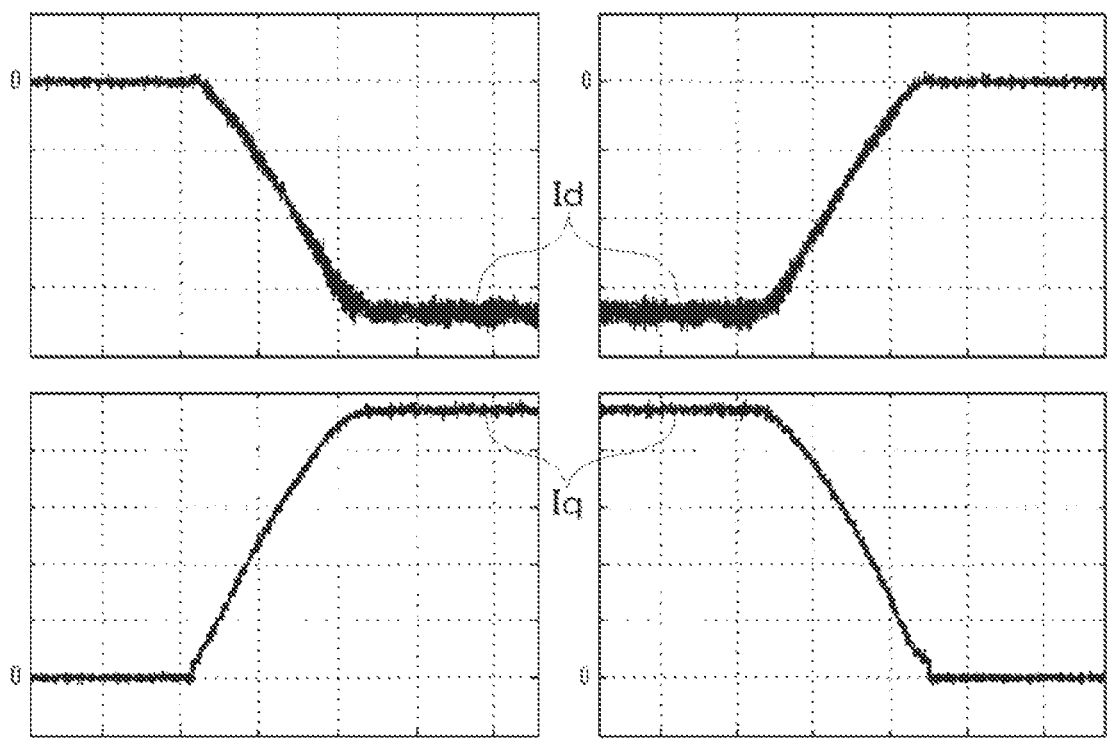
FIG. 16 is a waveform diagram showing an example of d-q-axis currents for a case in which a harmonic is superimposed.

FIG. 15 is a waveform diagram of results of experiments or simulations showing an example of d-q-axis currents Idq for a case in which a harmonic correction current instruction Idqh* is not superimposed, and FIG. 16 is a waveform diagram of results of experiments or simulations showing an example of d-q-axis currents Idq for a case in which a harmonic correction current instruction Idqh* is superimposed. In both FIGS. 15 and 16, waveforms at the top represent d-axis currents Id and waveforms at the bottom represent q-axis currents Iq. In addition, in both FIGS. 15 and 16, diagrams on the left are waveform diagrams of waveforms at timing at which the torque instruction T* changes from zero to "e [Nm]" (see FIGS. 7 and 8, etc.), and diagrams on the right are waveform diagrams of waveforms at timing at which the torque instruction T* changes from "e [Nm]" to zero.

All waveforms represent the waveforms of d-q-axis currents for a case in which the torque instruction T* changes in a stepwise manner. Overshoot or oscillation is not observed in any of the waveforms. That is, it has been confirmed that even when the correction current instruction Idqh* is superimposed on the base current instruction Idq*, as with a case of not superimposing, interference of the current control part 2 is suppressed.

Other Embodiments

Other embodiments will be described below. Note that a configuration in each embodiment described below is not limited to being applied alone, and can also be applied in combination with configurations in other embodiments as long as a contradiction does not arise.

(1) In the above description, a mode is exemplified and described in which the current control part 2 includes the first current control part 20 and the second current control part 21, and furthermore, the correction voltage instruction setting part 7 that performs feedforward control is provided in addition to the current control part 2 that performs feedback control. However, it does not inhibit a mode in which the current control part 2 includes only the first current control part 20, and the correction voltage instruction setting part 7 is not provided. In addition, in a mode in which the current control part 2 does not include the second current control part 21, the correction voltage instruction setting part 7 may be provided, or in a mode in which the correction voltage instruction setting part 7 is not provided, the current control part 2 may include the second current control part 21. In these cases, too, it is preferred that when the amount of fluctuation in the phase of the correction current instruction Idqh* relative to a fluctuation in the torque instruction T* for the rotating electrical machine 80 is large, a specific operating range E be set to limit the superimposing of the correction current instruction Idqh*

(2) In the above description, a mode is exemplified and described in which a part of the entire operating range of the rotating electrical machine 80 is set as a correction target operating range H which is a torque ripple reduction target (see FIG. 9). However, the entire operating range of the rotating electrical machine 80 may be the correction target operating range H.

(3) In the above description, a mode is exemplified in which the current control part 2 that performs feedback control includes the first current control part 20 and the second current control part 21, the gain of the second current control part 21 is set to be lower than the gain of the first current control part 20, and furthermore, the correction voltage instruction setting part 7 that performs feedforward control is provided. However, in a case, for example, in which convergence time for control can be satisfied, the rotating electrical machine control device 10 may be formed without including the correction voltage instruction setting part 7. In addition, a configuration in which the gain of the second current control part 21 is set to be lower than the gain of the first current control part 20 may include setting of the gain of the second current control part 21 to zero. In this case, substantially, the current control part 2 includes only the first current control part 20. Note that in this case, it is preferred that the correction voltage instruction setting part 7 be provided in addition to the first current control part 20 (current control part 2).

Summary of the Embodiments

A summary of the rotating electrical machine control device 10 (rotating electrical machine control system) described above will be briefly described below.

In one aspect, a rotating electrical machine control system (100) that performs current feedback control on a rotating electrical machine of a permanent magnet type (80) which is a control target and is driven by N-phase alternating current (N is any natural number) in a d-q-axis orthogonal vector coordinate system having a d-axis extending in a direction of field flux generated by permanent magnets (84) and a q-axis orthogonal to the d-axis includes: a base current instruction setting part (1) that sets a base current instruction (Idq*) serving as a current instruction which is an instruction value of a current to flow through the rotating electrical machine (84), based on target torque (T*) of the rotating electrical machine (80); a correction current instruction setting part (6) that sets a correction current instruction (Idqh*) which is a current instruction to be superimposed on the base current instruction (Idq*) to reduce torque ripple of the rotating electrical machine (80) and which is alternating current with a frequency determined based on the torque ripple of a reduction target; and a current control part (2) that performs current feedback control based on deviation between a target current instruction (Idq**) which is a control target and is obtained by adding together the base current instruction (Idq*) and the correction current instruction (Idqh*), and an actual current which is a current flowing through the rotating electrical machine (80), to compute a voltage instruction (Vdq*) which is an instruction value of a voltage to be applied to the rotating electrical machine (80), and the current control part (2) includes a first current control part (20) whose control target is a component of the base current instruction (Idq*); and a second current control part (21) whose control target is a component of the correction current instruction (Idq), and a gain of the second current control part (21) is set to be low compared to a gain of the first current control part (20**).

The component of the base current instruction (Idq*) which is a control target of the first current control part (20) is direct current in the d-q-axis orthogonal vector coordinate system, and the component of the correction current instruction (Idqh*) which is a control target of the second current control part (21) is alternating current in the d-q-axis orthogonal vector coordinate system. By the current control part (2) thus including the first current control part (20) and the second current control part (21) that have different control targets, current control can be appropriately performed on the base current instruction (Idq*) on which the correction current instruction (Idqh*) is superimposed, which is a control target. Meanwhile, when the target torque (T*) is suddenly changed, the base current instruction (Idq*) also suddenly changes, following the change. Since this change point includes a high frequency component, the second current control part (21) also performs current control targeting the base current instruction (Idq*), which may cause overshoot or oscillation in a voltage instruction (Vdq*) to be outputted. That is, there is a possibility of occurrence of control interference. However, according to this configuration, since the gain of the second current (21) is set to be low compared to the gain of the first current control part (20), such overshoot is suppressed and occurrence of oscillation is also suppressed. Namely, according to this configuration, even in a rotating electrical machine whose torque fluctuates, torque ripple can be appropriately reduced without causing control interference.

In addition, it is preferred that the rotating electrical machine control system (100) set a correction voltage instruction (Vdqh*) to be superimposed on the voltage instruction (Vdq*) by feedforward control to reduce torque ripple of the rotating electrical machine (80).

By superimposing the correction voltage instruction (Vdqh*) on the voltage instruction (Vdq*) by feedforward control, convergence time for control performed by the current control part (2) is reduced, improving responsiveness. For example, even when the gain of the second current control part (21) is set to be low compared to that of the first current control part (20), a voltage instruction (Vdq*) including a voltage instruction (Vdqh*) including a correction correction voltage instruction setting part (7) for generating correction torque can be appropriately computed.

In addition, when the correction voltage instruction setting part (7) is provided as described above, it is preferred that the correction voltage instruction setting part (7) set the correction voltage instruction (Vdqh*) based on the target torque (T*), a rotational speed of the rotating electrical machine (80), and a magnetic pole position (0) of the rotating electrical machine (80).

Torque ripple occurs based on the output torque and rotational speed of the rotating electrical machine (80). Thus, the correction voltage instruction (Vdqh*) is a voltage instruction (Vdq*) for outputting correction torque for reducing torque ripple. In addition, the magnetic pole position (0) is necessary for coordinate transformation. Thus, it is preferred that the correction voltage instruction (Vdqh*) be appropriately set based on the torque instruction (T*) and the rotational speed and magnetic pole position (0) of the rotating electrical machine (80).

In addition, it is preferred that the correction current instruction (Idqh*) be alternating current whose phase varies depending on the target torque (T*) of the rotating electrical machine (80), the correction current instruction setting part (6) reduce an amplitude of the correction current instruction (Idqh*) in a specific operating range (E) set based on the target torque (T*), and the specific operating range (E) be set in an operating range in which an amount of change in a phase of the correction current instruction (Idqh*) relative to a change in the target torque (T*) is greater than or equal to a predetermined value which is determined in advance.

According to this configuration, in the specific operating range (E), the amplitude of the correction current instruction (Idqh*) is small and correction torque for suppressing torque ripple is also small. As a result, it is possible to reduce the possibility that correction torque may amplify torque ripple when the phase of the correction current instruction (Idqh*) is shifted from an ideal phase. The specific operating range (E) is set in an operating range in which the amount of change in the phase of the correction current instruction (Idqh*) relative to a change in the target torque (T*) is greater than or equal to the predetermined value. Such a specific operating range (E) corresponds to a range in which a shift in the phase of the correction current instruction (Idqh*) is likely to be large. Thus, by reducing the amplitude of the correction current instruction (Idqh*) in the specific operating range (E), the possibility that correction torque may amplify torque ripple is reduced, whereas in other operating ranges, the torque ripple can be reduced by the correction torque. As such, according to this configuration, even in a rotating electrical machine whose torque fluctuates, torque ripple can be appropriately reduced.

In addition, when the specific operating range (E) is thus set, it is preferred that for a change in the target torque (T*), time required for a phase of the correction current instruction (Idqh*) to follow a phase determined based on the changed target torque (T*) be convergence time, and the specific operating range (E) be set based on an operating range in which when a maximum amount of change in torque that can occur within the convergence time has occurred, the torque ripple is amplified by the correction current instruction (Idqh*).

When the specific operating range (E) is set in such a manner, in an operating range in which control can follow, torque ripple is appropriately reduced, and in an operating range in which it is difficult for control to follow, torque ripple can be prevented from being amplified by correction torque.

In addition, when the specific operating range (E) is set based on an operating range in which when a maximum amount of change in torque that can occur within the convergence time has occurred, the torque oscillation is amplified by the correction current instruction (Idqh*), it is preferred that an amplitude of the torque ripple of a reduction target be identical to an amplitude of correction torque determined based on the correction current instruction (Idqh*), and the predetermined value be ±60 degrees.

When the amplitude of torque ripple of a reduction target is identical to the amplitude of correction torque determined based on the correction current instruction (Idqh*), the greatest reduction effect can be obtained. Note, however, that when the phase of optimal correction torque is shifted, the reduction effect decreases as the shift increases, and when the shift in the phase exceeds 60 degrees, the torque ripple is amplified. Thus, by setting the preset value to 60 degrees and setting, as a specific operating range E, an operating range in which the amount of change in the phase of the correction current instruction (Idqh*) relative to a change in the target torque (T*) is greater than or equal to the predetermined value, even if the target torque (T*) is suddenly changed, the torque ripple is not amplified and can be appropriately reduced.

In addition, it is preferred that when a rotational speed of the rotating electrical machine (80) is a predetermined correction target rotational speed, the correction current instruction setting part (6) set the correction current instruction (Idqh*).

By not superimposing the correction current instruction (Idqh*) in the entire operating range of the rotating electrical machine (80), a reduction in efficiency caused by superimposing the correction current instruction (Idqh*) is suppressed. In addition, in an operating range in which torque ripple needs to be suppressed, the correction current instruction (Idqh*) is superimposed, by which the torque ripple is appropriately suppressed.

REFERENCE SIGNS LIST

1: Torque control part (base current instruction setting part), 2: Current control part, 6: Correction current instruction setting part, 7: Correction voltage instruction setting part, 10: Rotating electrical machine control device (rotating electrical machine control system), 20: First current control part, 21: Second current control part, 80: Rotating electrical machine, 84: Permanent magnet, 100: Rotating electrical machine driving device (rotating electrical machine control system), E: Specific operating range, Idq*: Base current instruction, Idq**: Corrected current instruction (target current instruction), Idqh*: Correction current instruction, ST: Correction target rotational speed, T*: Torque instruction (target torque), Vdq*: Voltage instruction, Vdqh*: Correction voltage instruction, and θ: Magnetic pole position

The invention claimed is:

1. A rotating electrical machine control system that performs current feedback control on a rotating electrical machine of a permanent magnet type in a d-q-axis orthogonal vector coordinate system having a d-axis extending in a direction of field flux generated by permanent magnets and a q-axis orthogonal to the d-axis, the rotating electrical machine being a control target and driven by N-phase alternating current (N is any natural number), the rotating electrical machine control system comprising:

a base current instruction setting part that sets a base current instruction serving as a current instruction, based on target torque of the rotating electrical machine, the current instruction being an instruction value of a current to flow through the rotating electrical machine;

a correction current instruction setting part that sets a correction current instruction, the correction current instruction being a current instruction to be superimposed on the base current instruction to reduce torque ripple of the rotating electrical machine and being alternating current with a frequency determined based on the torque ripple of a reduction target; and a current control part that performs current feedback control based on deviation between a target current instruction and an actual current, to compute a voltage instruction, the target current instruction being a control target and obtained by adding together the base current instruction and the correction current instruction, the actual current being a current flowing through the rotating electrical machine, and the voltage instruction being an instruction value of a voltage to be applied to the rotating electrical machine, wherein the current control part includes a first current control part whose control target is a component of the base current instruction; and a second current control part whose control target is a component of the correction current instruction, and a gain of the second current control part is set to be low compared to a gain of the first current control part.

2. The rotating electrical machine control system according to claim 1, comprising a correction voltage instruction setting part that sets a correction voltage instruction to be superimposed on the voltage instruction by feedforward control to reduce torque ripple of the rotating electrical machine.

3. The rotating electrical machine control system according to claim 2, wherein the correction voltage instruction setting part sets the correction voltage instruction based on the target torque, a rotational speed of the rotating electrical machine, and a magnetic pole position of the rotating electrical machine.

4. The rotating electrical machine control system according to claim 1, wherein the correction current instruction is alternating current whose phase varies depending on the target torque of the rotating electrical machine, the correction current instruction setting part reduces an amplitude of the correction current instruction in a specific operating range set based on the target torque, and the specific operating range is set in an operating range in which an amount of change in a phase of the correction current instruction relative to a change in the target torque is greater than or equal to a predetermined value, the predetermined value being determined in advance.

5. The rotating electrical machine control system according to claim 4, wherein for a change in the target torque, time required for a phase of the correction current instruction to follow a phase determined based on the changed target torque is convergence time, and the specific operating range is set based on an operating range in which when a maximum amount of change in torque that can occur within the convergence time has occurred, the torque ripple is amplified by the correction current instruction.

6. The rotating electrical machine control system according to claim 5, wherein an amplitude of the torque ripple of a reduction target is identical to an amplitude of correction torque determined based on the correction current instruction, and the predetermined value is ±60 degrees.

7. The rotating electrical machine control system according to claim 1, wherein when a rotational speed of the rotating electrical machine is a predetermined correction target rotational speed, the correction current instruction setting part sets the correction current instruction.

\* \* \* \* \*